United States Patent
Newbern et al.

(10) Patent No.: US 10,606,827 B2
(45) Date of Patent: Mar. 31, 2020

(54) RECONFIGURABLE DISTRIBUTED PROCESSING

(71) Applicant: Ab Initio Technology LLC, Lexington, MA (US)

(72) Inventors: Jeffrey Newbern, Sudbury, MA (US); Craig W. Stanfill, Lincoln, MA (US)

(73) Assignee: Ab Initio Technology LLC, Lexington, MA (US)

( * ) Notice: Subject to any disclaimer, the term of this patent is extended or adjusted under 35 U.S.C. 154(b) by 203 days.

(21) Appl. No.: 15/597,302

(22) Filed: May 17, 2017

(65) Prior Publication Data

US 2017/0337241 A1    Nov. 23, 2017

Related U.S. Application Data

(60) Provisional application No. 62/337,422, filed on May 17, 2016.

(51) Int. Cl.
*G06F 16/23* (2019.01)
*G06F 9/448* (2018.01)
(Continued)

(52) U.S. Cl.
CPC ........ *G06F 16/2365* (2019.01); *G06F 9/4494* (2018.02); *G06F 9/5061* (2013.01);
(Continued)

(58) Field of Classification Search
CPC .... G06F 16/2365; G06F 16/27; G06F 9/4494; G06F 16/24568; G06F 16/278; G06F 9/5061; G06F 9/5066; H04L 41/0803
See application file for complete search history.

(56) References Cited

U.S. PATENT DOCUMENTS 5,241,652 A    8/1993   Barabash et al.
5,819,021 A    10/1998  Stanfill et al.
(Continued)

FOREIGN PATENT DOCUMENTS

EP    2504773    10/2012
EP    2966569    1/2016
(Continued)

OTHER PUBLICATIONS

Janssens, Nico, Sam Michiels, Tom Holvoet, and Pierre Verbaeten. "A modular approach enforcing safe reconfiguration of producer-consumer applications." In 20th IEEE International Conference on Software Maintenance, 2004. Proceedings., pp. 274-283. IEEE, 2004. (Year: 2004).*

(Continued)

*Primary Examiner* — Jesse P Frumkin
(74) *Attorney, Agent, or Firm* — Occhiuti & Rohlicek LLP

(57) ABSTRACT

Distributed processing of a data collection includes receiving information for configuring a distributed processing system. A first configuration of components is formed including sources of data elements and workers configured to process data elements, distributed among computing resources. Each data element includes a partition value that identifies a subset of the workers according to a partition rule. Data elements are accepted from the sources for a first part of the data collection in a first processing epoch and the data elements are routed through the first configuration. After accepting a first part of the data collection, change of configuration is initiated to a second configuration. A succession of two or more transitions between configurations of components is performed to a succession of modified configurations, a last of which corresponds to the second configuration. Further data elements are accepted from (Continued)

sources of the second configuration in a second processing epoch.

22 Claims, 19 Drawing Sheets

(51) Int. Cl.
  *G06F 16/27* (2019.01)
  *G06F 16/28* (2019.01)
  *G06F 16/2455* (2019.01)
  *G06F 9/50* (2006.01)
  *H04L 12/24* (2006.01)

(52) U.S. Cl.
  CPC ...... *G06F 9/5066* (2013.01); *G06F 16/24568* (2019.01); *G06F 16/27* (2019.01); *G06F 16/278* (2019.01); *G06F 16/285* (2019.01); *H04L 41/0803* (2013.01)

(56) References Cited

U.S. PATENT DOCUMENTS

| | | | |
|---|---|---|---|
| 7,793,147 B2 | 9/2010 | Stange et al. | |
| 8,059,125 B2 | 11/2011 | Stanfill | |
| 9,043,401 B2 | 5/2015 | Wong et al. | |
| 9,760,406 B2 | 9/2017 | Stanfill et al. | |
| 9,785,419 B2 | 10/2017 | Stanfill et al. | |
| 10,356,150 B1* | 7/2019 | Meyers | H04L 65/608 |
| 2007/0016907 A1 | 1/2007 | Benedetti et al. | |
| 2009/0144346 A1 | 6/2009 | Duffy et al. | |
| 2009/0287986 A1 | 11/2009 | Vishniac et al. | |
| 2012/0278587 A1 | 11/2012 | Canfield et al. | |
| 2015/0046541 A1* | 2/2015 | Kang | H04L 45/28 709/206 |
| 2016/0062776 A1 | 3/2016 | Stanfill et al. | |
| 2017/0177414 A1* | 6/2017 | Newbern | G06F 9/5072 |
| 2017/0337241 A1 | 11/2017 | Newbern et al. | |

FOREIGN PATENT DOCUMENTS

| | | |
|---|---|---|
| JP | 2011120817 | 6/2011 |
| WO | 2015070232 | 5/2014 |

OTHER PUBLICATIONS

Orailoglu, Alex. "Microarchitectural synthesis of gracefully degradable, dynamically reconfigurable ASICs." In Computer Design: VLSI in Computers and Processors, 1996. ICCD'96. Proceedings., 1996 IEEE International Conference on, pp. 112-117. IEEE, 1996.

* cited by examiner

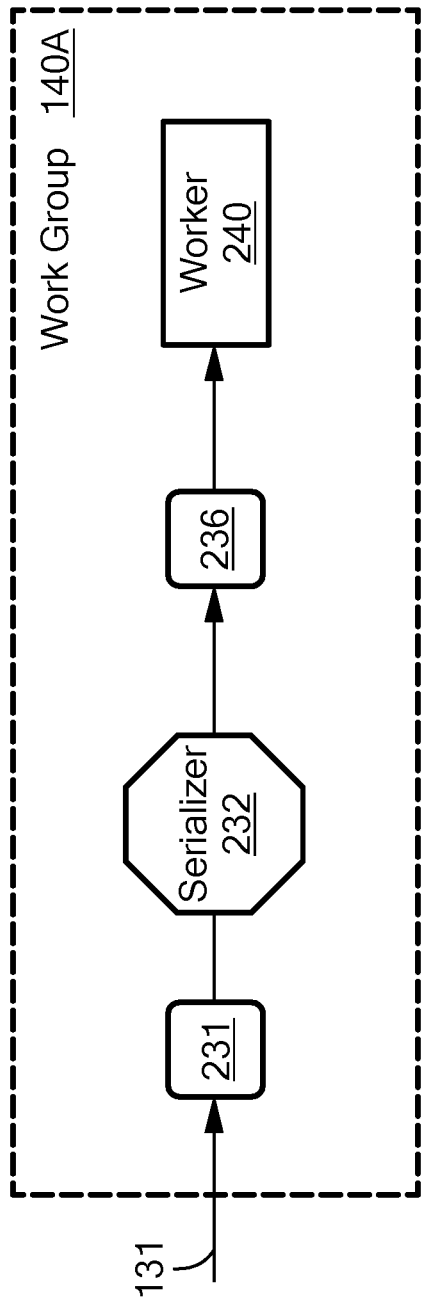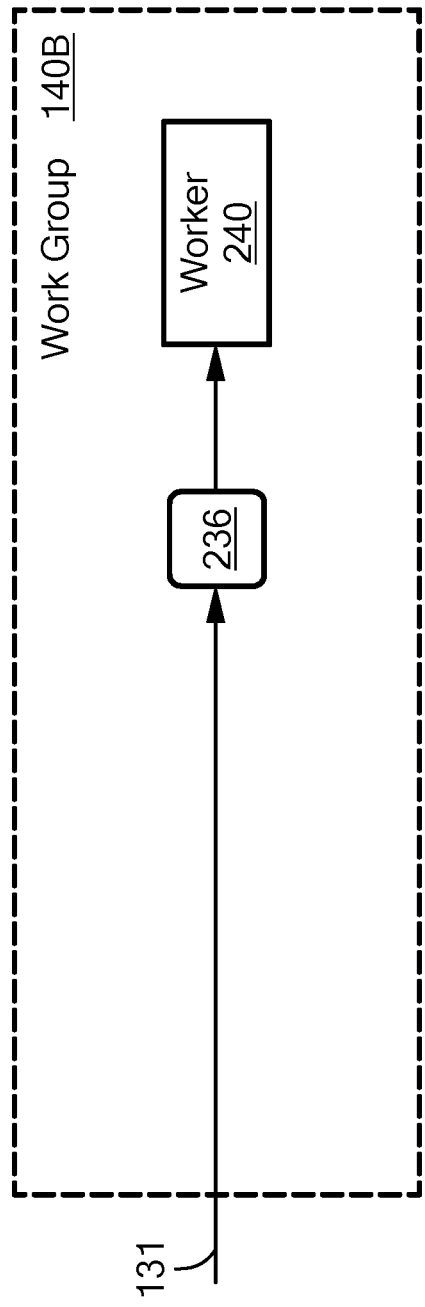

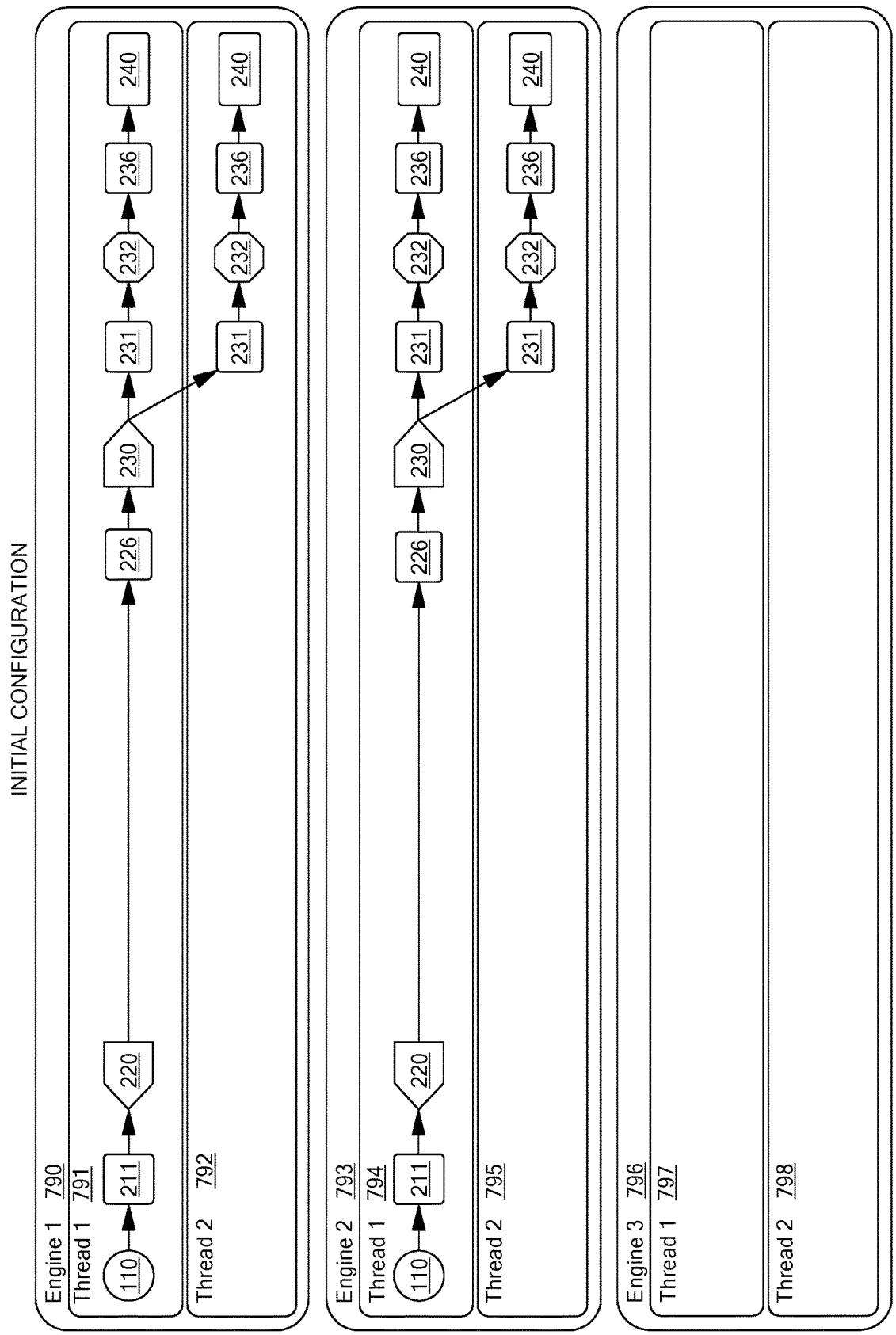

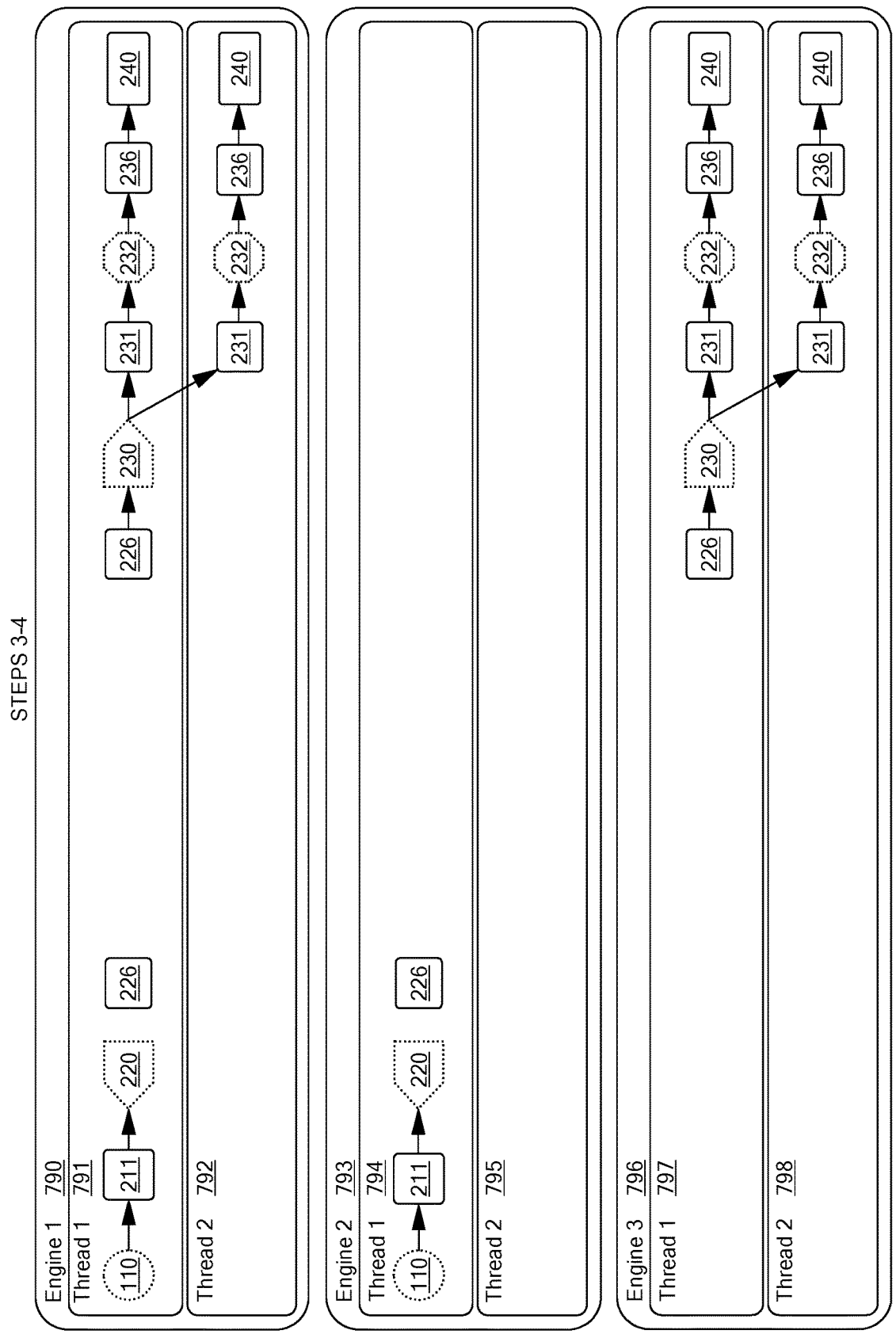

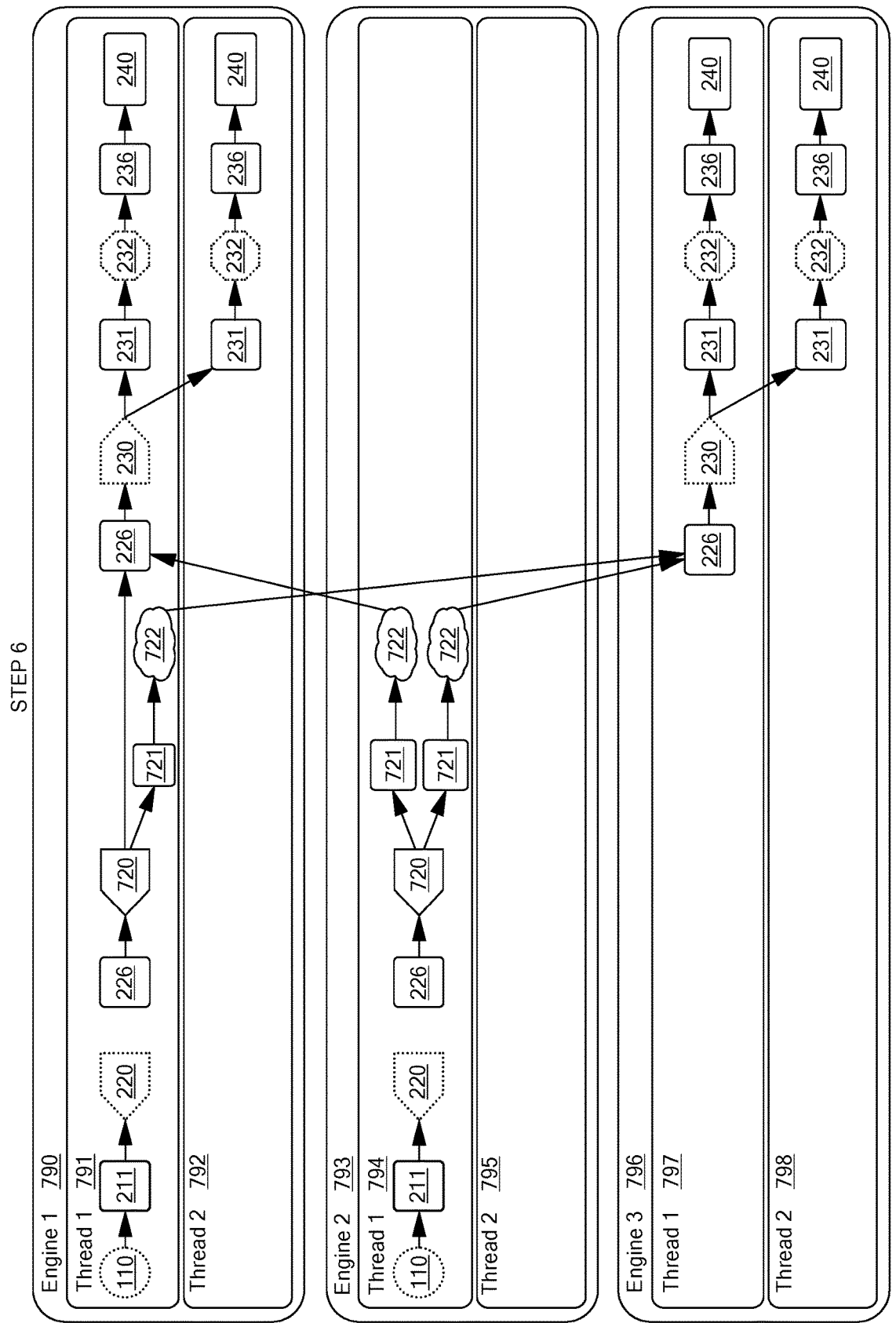

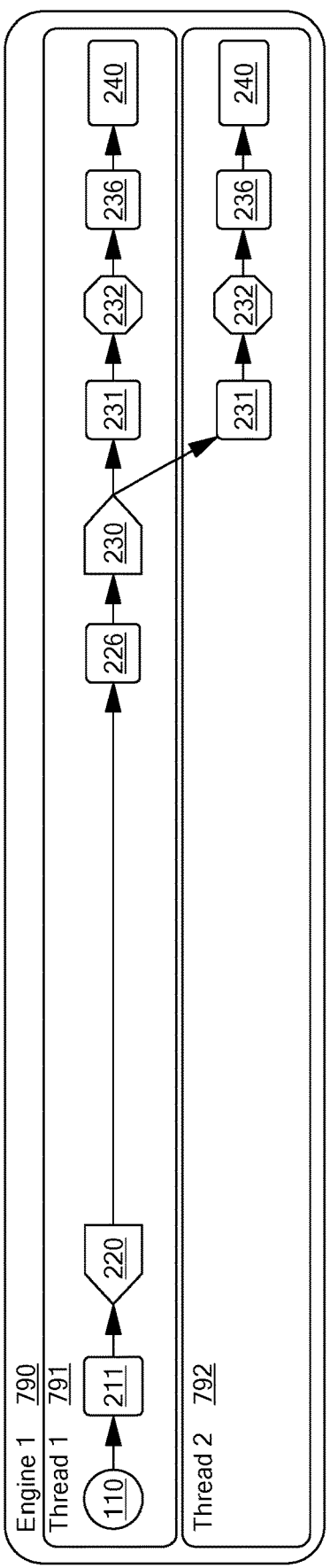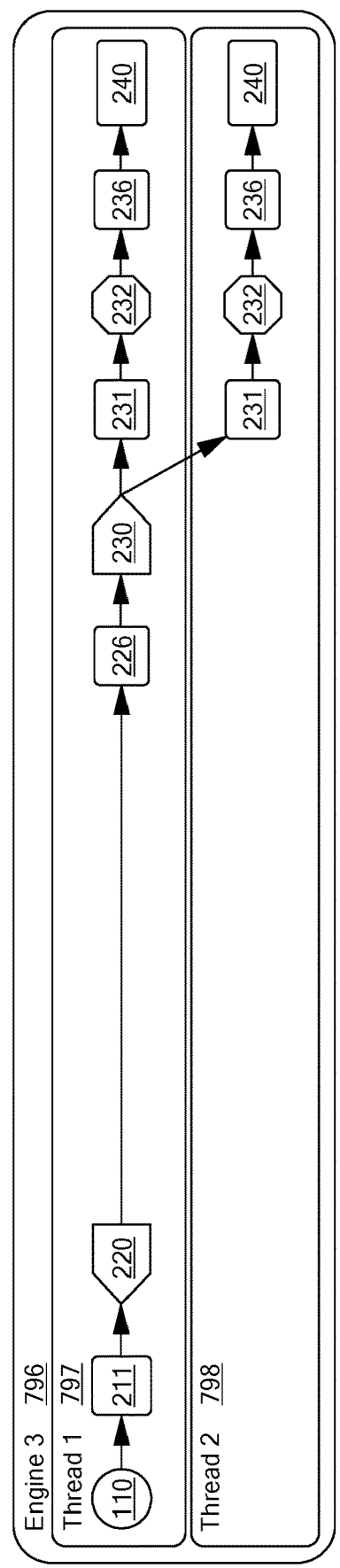
FIG. 11I

RECONFIGURABLE DISTRIBUTED PROCESSING

CROSS-REFERENCE TO RELATED APPLICATIONS

This application claims priority to U.S. Application Ser. No. 62/337,422, filed on May 17, 2016, incorporated herein by reference.

BACKGROUND

This invention relates to an approach to distributed processing that is reconfigurable, and more particularly to distributed processing approach that is reconfigurable in response to changes in number of loci of processing or changes in number of data producer or consumer loci.

Distributed processing of a set of data elements may use a number of producers of data elements (i.e., each being a locus of data production), for example, different computer servers, or physical or logical processors within a multiprocessor system, each providing data access (e.g., from a database) or data storage (e.g., from a disk file system) for part of the data to be processed. Similarly, the results of the processing may be sent to a number of loci of data consumption (e.g., processing, storage, transmission), which again may be a set of computer servers or processors. Processing itself may be distributed among different processing loci, for instance each loci being associated with different physical resource such as separate computer servers or processors on servers, or logical resources such as operating system processes on servers, and/or threads of processing within operating system processes. One approach to coordinating the processing is to determine an arrangement of the producer, processing, and consumer loci, for example, in a graph-based data-flow architecture.

SUMMARY

One approach to distributed processing is described in U.S. Pat. Pub 2016/0062776, titled "Executing Graph-Based Program Specifications," published on Mar. 3, 2016, which is incorporated herein by reference. One aspect of this system is implementation of a "forall" operation in which all data elements of a data collection are processed without necessarily requiring strict ordering of the elements of a collection. In general, a source of the data elements is distributed across a number of computing resources (e.g., servers) and the results of processing of the data elements is distributed across a number of computing resources.

In some cases processing data elements of a data collection has no constraints on ordering and/or concurrency of processing of elements, and distribution of the computational and/or storage load among resources is largely based on efficiency considerations.

In other cases, there may one or both of two types of constraints. A first constraint, referred to below as the "partitioning constraint," relates to maintaining strict ordering of certain subsets of the data elements. To specify this constrain, each element can include a "partition key" field, and the constraint is that for data elements with (a) the same partition key value and (b) retrieved from the same part of the data source (i.e., from the same storage device or the same server), the order of arrival of data elements at the locus of processing is guaranteed to be the same as the order in which the data elements are retrieved from that data source. In general, processing of data elements that arrive at the locus of processing may be processed concurrently.

A second constraint, referred to below as the "concurrency constraint," relates to preventing concurrent processing of elements in certain subsets of data elements at a locus of processing. To specify this constraint, each element can include a "concurrency key" field, and the constraint is that no two data elements with the same concurrency key may be processed concurrently at that locus of processing.

Either of the constraints may be applied alone in processing data elements by the system, or both constraints may be imposed together on the processing. In some examples, two data elements with the same value of a concurrency key are guaranteed to have the same value of the partition key (e.g., the concurrency key is an "extension" of the partition key), however, more generally, the concurrency key values are independent of the partition key values of data elements. When the concurrency key is an extension of the partition key (or the partition is otherwise unique for data elements with the same concurrency key) the concurrency constraint guarantees that no two data elements with the same concurrency key are processed concurrently at any locus of processing of the system.

There is a need to provide a way to distribute over a set of computing resources "forall" processing of elements of a data collection in a manner that satisfies the partition and/or concurrency constraints identified above. There is furthermore a need for the way of distributing the processing to permit reconfiguration or reallocation of the computing resources while continuing to satisfy the partition and sequencing constraints.

In one aspect, in general, a method for distributed processing of a data collection includes receiving, over an input device or port, information for configuring a distributed processing system, the configuring including forming a first configuration of components of the distributed processing system. The first configuration includes a plurality of sources of data elements of the data collection and a plurality of workers configured to process data elements of the data collection, with the sources and workers being distributed among a plurality of computing resources. Each data element includes a partition value that identifies a subset of the plurality of workers of the first configuration according to a partition rule of the first configuration of components. Data is processed in the distributed processing system during at least two processing epochs, the processing including the following steps. Data elements are accepted from the sources for a first part of the data collection in a first processing epoch and these data elements are routed through the first configuration. Processing is completed for at least some of those data elements of the first part, while other of the data elements of the first part (i.e., other than the data elements for which processing is completed) remain queued at components of the first configuration. After accepting the first part of the data collection, a change of configuration of the distributed processing system from the first configuration to a second configuration is initiated. After initiating the change of configuration, a succession of two or more transitions between configurations of components of the system is performed to form a succession of modified configurations of components. After each transition, data elements are transferred between components of the modified configuration. A last of the modified configurations corresponds to the second configuration, thereby completing a transition from the first configuration to the second configuration. After completing a transition to the second configuration, further data elements of the data collection are accepted from a plurality of sources of the second configuration in a second processing epoch.

Aspects may include one or more of the following features.

The plurality of computing resources includes a plurality of processors coupled via communication links.

The plurality of computing resources includes at least one processing thread executing on each of the plurality of processors, each computing resource being associated with a distinct processing thread.

Each source of data elements is coupled to a partitioner module configured to accept data elements from the source, and wherein each partitioner is configured with the partition rule to direct data elements to a worker identified according to the partition rule.

Performing a first transition of the succession of two or more transitions between configurations of components of the system includes: halting operation of the partitioner modules, stopping of acceptance of data elements from the sources at the partitioner modules, reconfiguring the plurality of partition modules with a modified partition rule, and coupling at least one queue of data elements accepted from a source to provide data elements to a partition module reconfigured with the modified partition.

Each partitioner module is hosted on a same computing resource as a source coupled to said partitioner module, wherein passing data elements from said source to said partitioner is performed without requiring inter-processor communication.

The plurality of workers includes one or more workers each worker of said one or more workers being coupled to an accepter module configured to accept data elements from a plurality of partitioner modules.

Performing a first transition of the succession of two or more transitions between configurations of components of the system includes: halting operation of the partitioner modules, stopping of acceptance of data elements from the sources at the partitioner modules, halting operation of the plurality of accepter modules, reconfiguring the plurality of partition modules with a modified partition rule, and coupling at least one queue of an accepter module of the plurality of accepter modules to provide data elements to a partition module reconfigured with the modified partition.

Each accepter module is hosted on a same computing resource as a worker coupled to said accepter module, wherein passing data elements from said accepter module to said worker is performed without requiring inter-processor communication.

A first partitioner module is hosted on a same computing resource as a first accepter module, and is hosted on a different computing resource than a second accepter module, and wherein routing the data elements includes passing data elements from the first partitioner module to the first accepter module without requiring inter-processor communication, and wherein routing the data elements includes queuing data elements at the first partitioner module prior to inter-processor communication of said data elements for passing to the second accepter module.

The plurality of workers includes one or more workers each worker of said one or more workers being coupled to an accepter module configured to accept data elements from a plurality of partitioner modules.

Data elements are received from any one of the partitioner modules in a first-in-first-out order.

Each data element further includes a serialization value, and wherein during the first processing epoch, processing using the first configuration enforces a serialization policy whereby no two data elements with a same serialization value are processed by a worker concurrently with one another.

The plurality of workers includes one or more workers each worker of said one or more workers being coupled to an accepter module configured to accept data elements from a plurality of partitioner modules, the accepter module being configured to enforce a serialization policy whereby no two data elements with a same serialization value are processed by a worker coupled to said accepter module concurrently with one another.

After the first processing epoch and prior to the second processing epoch, processing according to each modified configuration continues to enforce the serialization policy.

During the first processing epoch, processing using the first configuration of components enforces a partition policy whereby all data elements with a same partition value accepted from a first data source in a first order are provided to a same subset of the plurality of workers in the first order.

After the first processing epoch and prior to the second processing epoch, data elements of the first part of the data that have not completed processing in the first epoch and with the same partition value accepted from the first data source are provided to the same worker in the first order.

At least some of said data elements are transferred between components of the modified configurations.

The second configuration of components differs from the first configuration in at least one of: (a) a partition rule; (b) a set of sources; and (c) a set of workers. For example, the partition rule can be different in either or both of the mapping used to perform the partitioning or in the number partitions formed; the set of sources can be different in either or both the number of sources used or the placement of sources on servers hosting the computing resources; and the set of workers can be different in either or both the number of workers used or the placement of workers on servers hosting the computing resources.

In another aspect, in general, software stored on non-transitory machine-readable media includes instructions stored thereon. The instructions when executed by one or more processors of a data processing system cause the data processing system to perform all the steps of any of the methods set forth above.

In another aspect, in general, a distributed processing system includes a plurality of processing engines and is configured to execute configurations of components distributed among said processing engines. The system is configured to perform, during processing of data elements from one or more data sources, all the steps of any of the methods set forth above.

Aspects may have one or more of the following advantages.

Reconfiguration of components of the system can be performed during processing of a collection of data elements without requiring full quiescence of the all components of the system. A consequence of this is that overall efficiency or throughput is improved over other approaches. Reconfiguration may be initiated for various reason, including for reasons related to more efficient use of available resources, for example, to match characteristics of the data elements being processed or characteristics of computing resources available to be applied to the processing.

Other features and advantages of the invention are apparent from the following description, and from the claims.

DESCRIPTION OF DRAWINGS

FIG. 5 is a block diagram of a configuration of components within a work group;

FIG. 6 is a block diagram of an alternative configuration of components within a work group;

FIGS. 11A-I are illustrations of a series of configurations from an initial configuration shown in FIG. 11A corresponding to FIG. 1A to a final configuration shown in FIG. 11I corresponding to FIG. 1C via intermediate configurations shown in FIGS. 11B-H.

DESCRIPTION

Figure 1A:
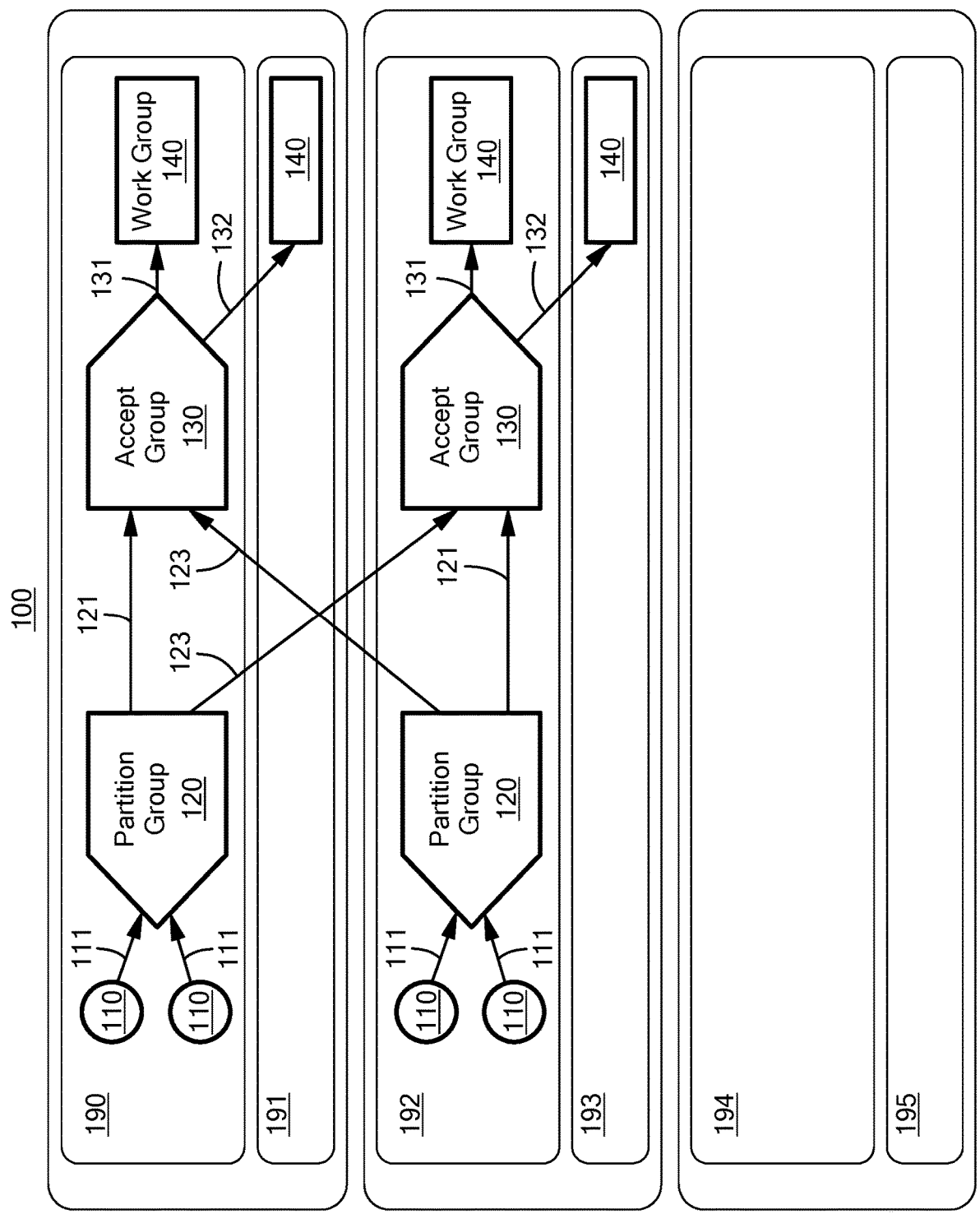
FIG. 1A is a block diagram of a distributed processing configuration involving partition groups, accept groups, and work groups for processing components.

Referring to FIG. 1A, a distributed processing configuration 100 of a distributed processing system passes data elements of a data collection from a number of sources 110 to a number of work groups 140 in which the data elements are processed or otherwise consumed. Generally, data elements from a source 110 are passed via a partitioning group 120 such that different data elements are passed to different destinations according to a partitioning rule. In this configuration, elements that have a same partition key value are passed to a same destination from each partitioning group 120. In general, different partition groups 120 of the configuration use the same partition rule, which results in data elements with a same value of partition key to be passed to the same destination by the partition groups.

The partitioning groups 120 pass data elements to accept groups 130. Generally, each of the partition groups uses the same partitioning rule so that any particular accept group receives all the elements of the data collection that are in a particular part (i.e., a disjoint set of partition key values) defined by the partitioning rule.

Each accept group 130 passes elements to one or more work groups 140, which perform the processing on the elements passed to them. Generally, each accept group 130 and the work groups 140 to which it passes elements together enforce the concurrency constraints. In this configuration, in general, all the data elements with a same value of the concurrency key are routed to a same accept group 130 by the partition groups, and then the accept group 130 and its work groups 140 operate to prevent concurrent processing of any two elements with a same concurrency key.

It should be understood that the components illustrated in FIG. 1 are generally distributed over different computing resources. For illustration in FIG. 1, separate computing resources 190-195 are indicated. Resources 190 and 191 represent different processing threads executing on a server computer, and resources 192 and 193 and resources 194 and 195 represent different processing threads on a different server computer. Therefore, some inter-component links that represent communication between components correspond to communication within a single thread (e.g., links 111, 121, 131), some represent communication between different threads on a single computer (e.g., link 132), and some represent communication between server computers (e.g., link 123).

The allocation of components illustrated in FIG. 1A to different computing resources can be determined before execution of the overall "forall" processing task. There are times that the set of components, or the allocation of components to computing resources of the distributed processing system may change. For example, in FIG. 1B, a third accept group 130, with a further work group 140, may be added. As another example, in FIG. 1C, components from one of the servers (e.g., processing threads 192 and 193) are migrated to another server (e.g. threads 194 and 195).

Figure 1B:
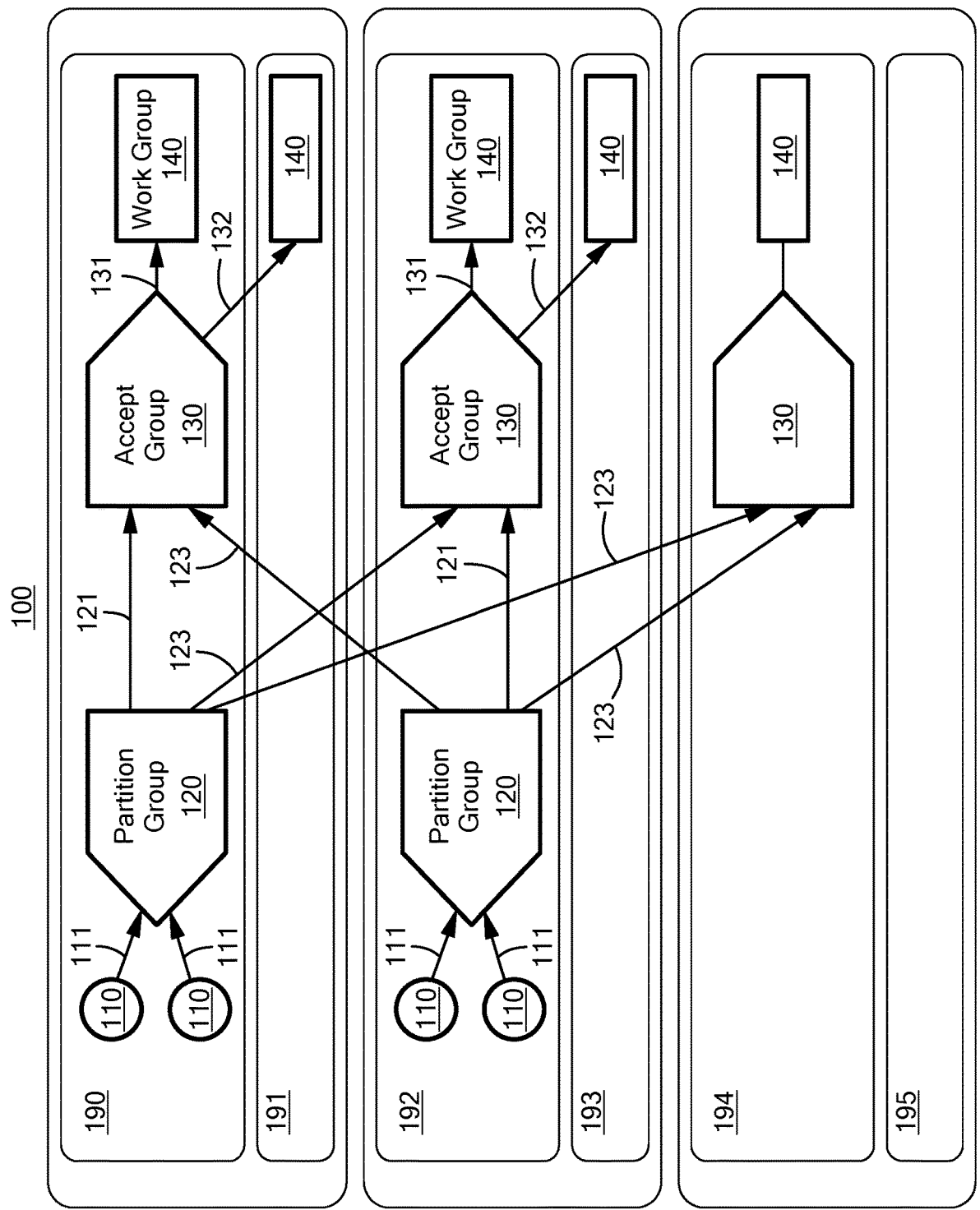
FIG. 1B is a block diagram of a distributed processing configuration that adds an accept group and a work group to the configuration of FIG. 1A.
Figure 1C:
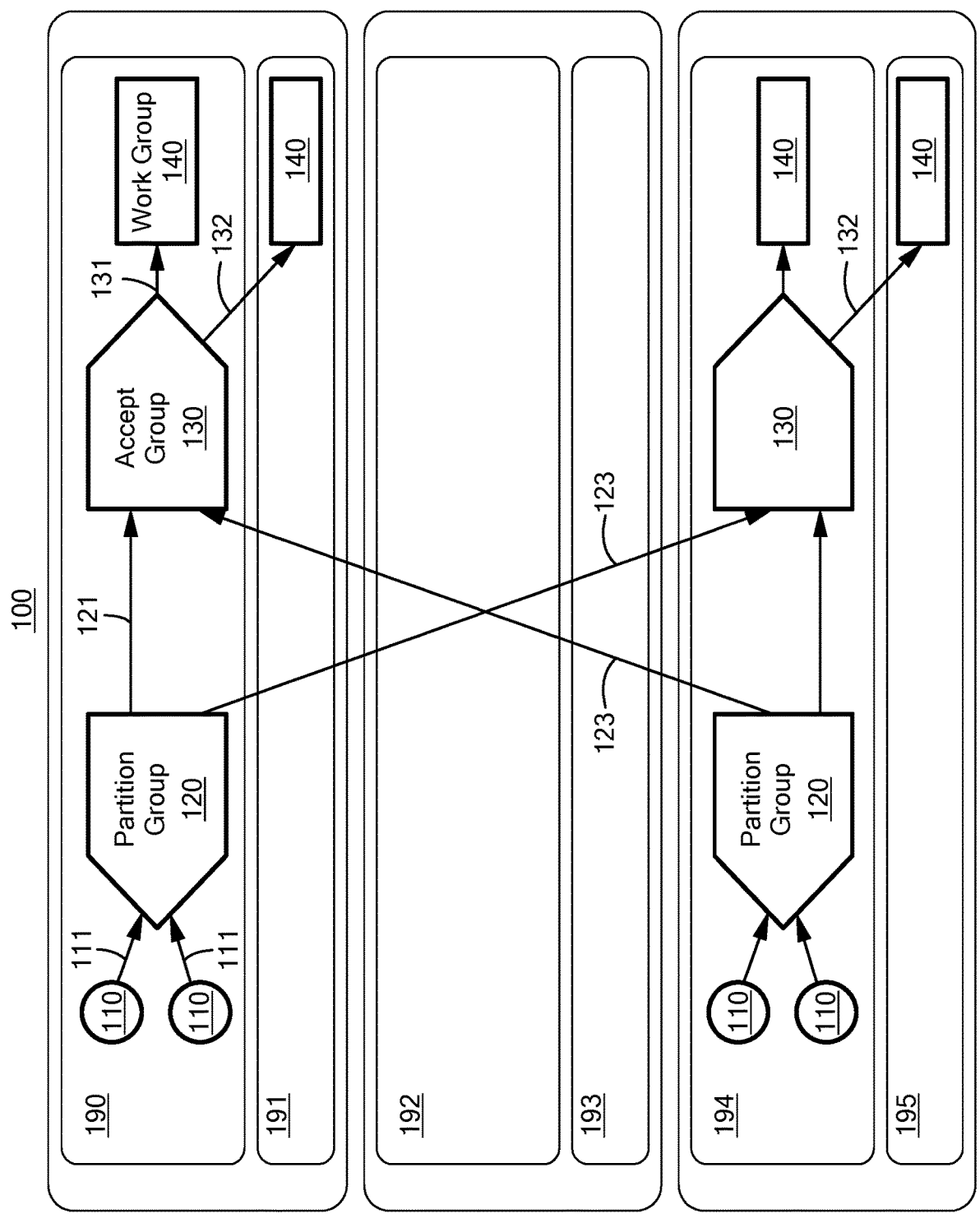
FIG. 1C is a block diagram of a distributed processing configuration that migrates components from one host to another relative to the configuration of FIG. 1A.

One scenario for a transition from the configuration of FIG. 1A to the configuration of FIG. 1B is for increasing the processing rate by increasing the number of work groups. It should be recognized that with two accept groups 130, the data elements are partitioned into two parts by the partition groups 120, while in the final configuration with three accept groups, the partition groups 120 perform a three-way partition of the data elements. It is important that the processing rules are not violated during the transition from the two-way to the three-way partitioning configuration. A scenario for transition from the configuration of FIG. 1A to the configuration of FIG. 1C is use of a different server, which may have different capacity.

One approach to changing the configuration may be to simply stop providing elements from the sources 110 and waiting until the system completes all processing so that no elements are "in flight" between the sources 110 and the work groups 140. Then the new configuration may be started without the possibility of violating the ordering by partition key constraint or the sequencing according to the concurrency key constraint. However, such an approach may be inefficient in that the computation resources may be under-utilized while waiting for all the elements that were already provided by the sources 110 to be processed. An alternative approach uses a transitory sequence of modified configurations of components of the system that are chosen in such a way that the constraints remain satisfied in each modified configuration and the computing resources remain well utilized. In an embodiment described below, certain of the components shown in FIGS. 1A and 1B are implemented as a number of constituent components, and the transitory sequence of configurations involves changing connections between these constituent components. Before description for the transitions to achieve an overall change in configuration, such as a change from the configuration shown in FIG. 1A to the configuration shown in FIG. 1B, or a change from the configuration shown in FIG. 1A to the configuration shown in FIG. 1C, a description of the constituent components is provided in FIGS. 2-6. In these figures, the components of FIG. 1A-C are shown in dashed lines for reference showing the constituent components and their interconnection within them is solid lines.

Figure 2:
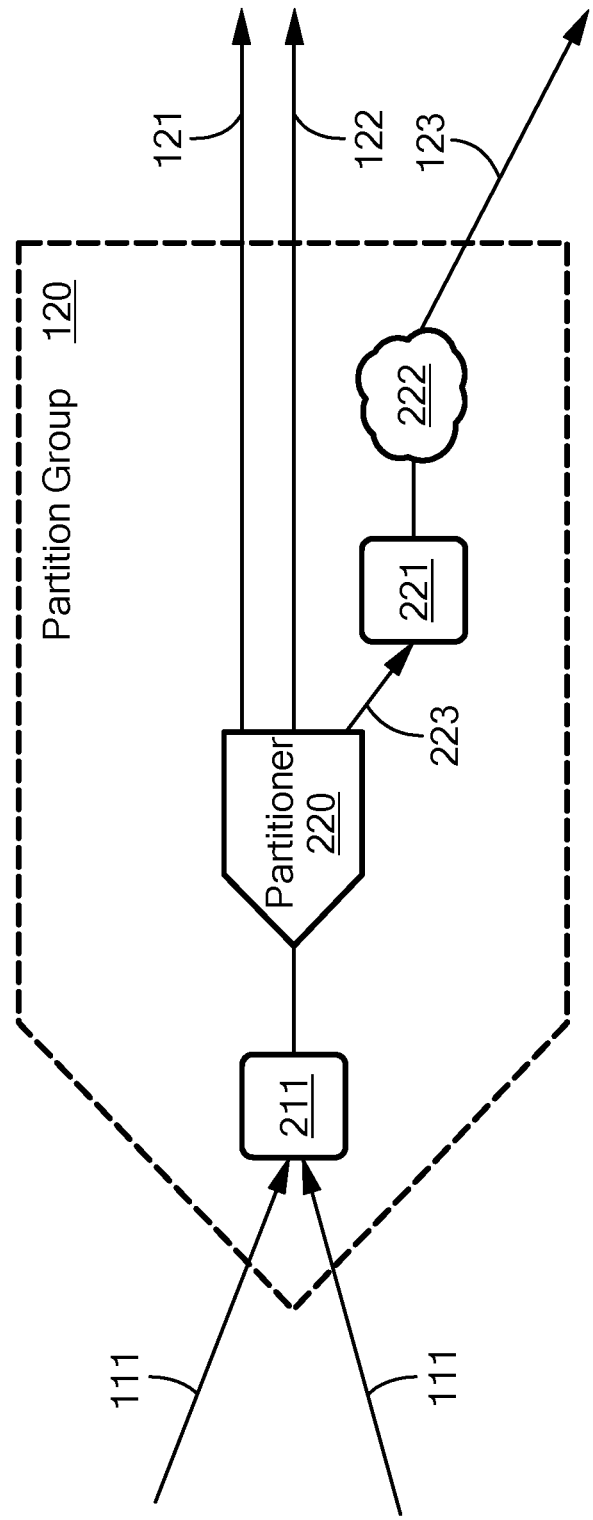
FIG. 2 is a block diagram of a configuration of components within a partition group.

Referring to FIG. 2 a partition group 120 includes a first-in-first-out (FIFO) queue 211, which accepts data elements over data paths 111 from the data sources 110. Because the queue 211 is FIFO, the partitioning constraint is maintained through the queue. A partitioner 220 implements a partitioning rule with which the partitioner is configured (e.g., according to a data storage for data representing the partition rule that in within or accessible to the partitioner). For example, if the partition key corresponds to a last name, the partition rule may define the parts according to the first letter of the last name, and the range 'A'-'H' may be passed on a first output data path 121, 'I'-'P' through a second data path 122, and 'S'-'Z' over a third data path. In some examples, the partition rule may use other forms of mappings to map values to data paths, such as mappings that incorporate functions, such as a hash function. Data paths leaving the partitioner 220 may be of various types, including: (1) a data path 121 that remains on the same computing resource (e.g., the same thread on a processor); (2) a data path 122 to a component executing on a different computing resource (e.g., a different thread) where the different computing resource shares runtime storage (e.g., shared dynamic memory) with the computing resource of the partitioner 220; and (3) a path 223 over which data elements are passed to a different computing resource where communication to that different computing resource requires inter-processor communication (e.g., data network communication). In order to implement the inter-processor communication from the partitioner 220, the partition group 120 also includes a FIFO queue 221, as well as a communication component 222, which is responsible to cause the data elements it receives to be moved to a particular remote computing resource over a data path 123, for example, using a Remote Procedure Call (RPC) mechanism.

Figure 3:
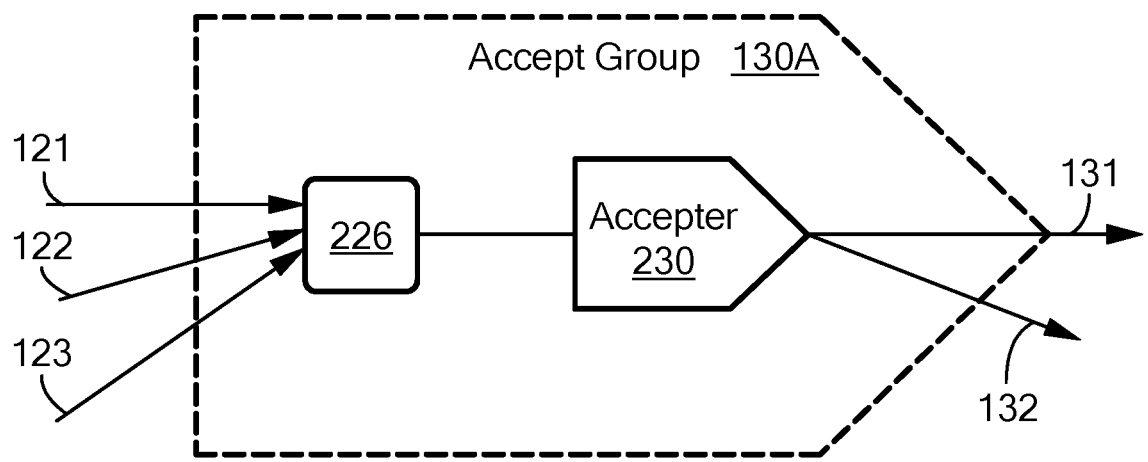
FIG. 3 is a block diagram of a configuration of components within an accept group.

Referring to FIG. 3, the accept group 130 is implemented as a first example as an accept group 130A using a FIFO queue 226, which can receive data elements over different types of data paths, for instance the data paths 121, 122, and 123 described above. In some examples, the first-in-first-out policy of the queue 226 may be relaxed to only require that data elements from any one data path are maintained in a first-in-first-out order, for example, by implementing a separate FIFO queue for each input data path and servicing those queue in turn, for example, according to a round-robin policy. The accept group 130A of FIG. 3 also includes an accepter 230, which can provide data elements for processing to multiple work groups 140. For example, the accepter may send data elements to one or more work groups 140 on the same computing resource (e.g., the same thread) over data paths 131, and/or to one or more work groups 140 on different computing resources that share runtime storage with it over data paths 132. In the configuration shown in FIG. 3, the accepter may dispatch multiple data elements for concurrent processing by multiple work groups 140. Therefore, in embodiments that implement a serialization key policy, the accepter is configured to enforce the serialization key constraint by never dispatching two data elements to work groups 140 such that they might be concurrently processed. The accepter is configured according to a data storage for data representing the sequencing rule that in within or accessible to the accepter.

Figure 4:
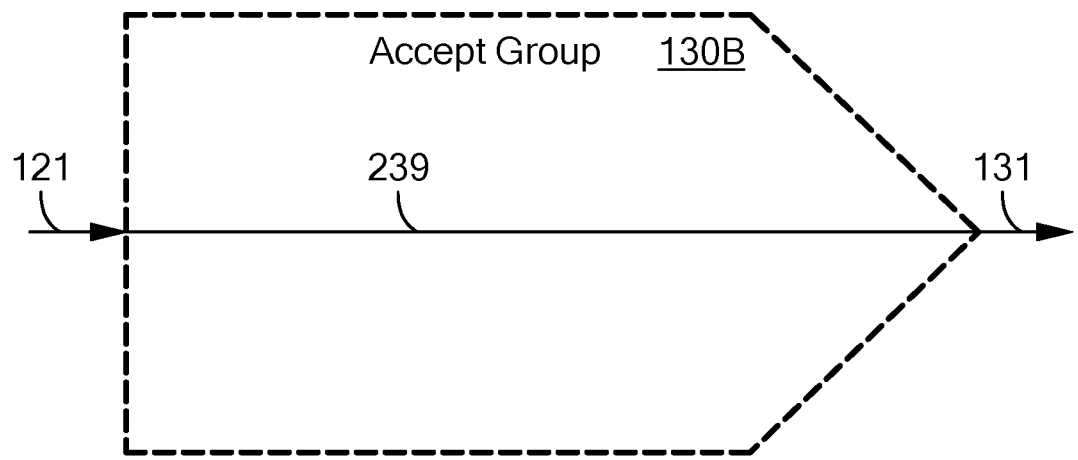
FIG. 4 is a block diagram of an alternative configuration of an accept group.

Referring to FIG. 4, in some configurations, the accept group 130 may be implemented as a second example as an accept group 130B merely has a data path 239 when there is only a single input data path 121 and only a single output data path 131. When such an accept group 130B is allocated to the same computing resource as its output work group 140 and the same computing resource as the single partition group 120 that provides it data elements, the partition group 120 (i.e., the partitioner 220 within that partition group) can directly provide data elements to the work group 140 without any concern of violating the partitioning and sequencing constraints.

Referring to FIG. 5, in some configurations, the work group 140 may be implemented as a first example of a work group 140A. A FIFO queue 231 receives data elements originating at one or more partition groups, and maintains their order (at least within data elements from each partition group). A serializer 232 enforces serialization by delaying data units to prevent two data elements with a same value of the serialization key to be downstream of the serializer and not yet completely processed. The serializer passes data elements to a FIFO queue 236, and a worker 240 initiates processing of data elements from the queue 236 in order and in generally processes more than a single data element concurrently. In the context of this description, a "worker" is a software-implemented element of the system that performs work (i.e., one or more of computational, storage, and transmission functions) on the data elements it receives. In some cases the work performed by the worker causes a side effect, such as a change of data in a database or other data storage arrangement accessible to the worker. In some implementations, a worker 240 may have a single thread of execution (e.g., being implemented as an operating system process, lightweight process, or thread) while in other implementations the worker 240 may have multiple threads of execution that do not block one another, and it should be understood that the system may have various types of workers, for example with difference throughput capacities.

Referring to FIG. 6, another example of a work group 140, work group 140B, includes the FIFO queue 236 as in the example shown in FIG. 5. In this example, there is no serialization constrain, and the worker 240 receives data elements directly from the queue 236, which receives its data elements from the input data path of the work group.

In general, a number of different topological patterns are typical given the constituent components described above. One important property to observe in all these examples is that for each pair of a source 110 and a queue 236 that provides data elements to a worker 240, there is exactly one path from the source to that queue. Along the path, when there is buffering in a queue, it is according to a FIFO policy. Therefore, all data elements in a same partition provided by that source arrive in order at the queue for that partition, thereby guaranteeing the partition constraint is satisfied.

Figure 7:
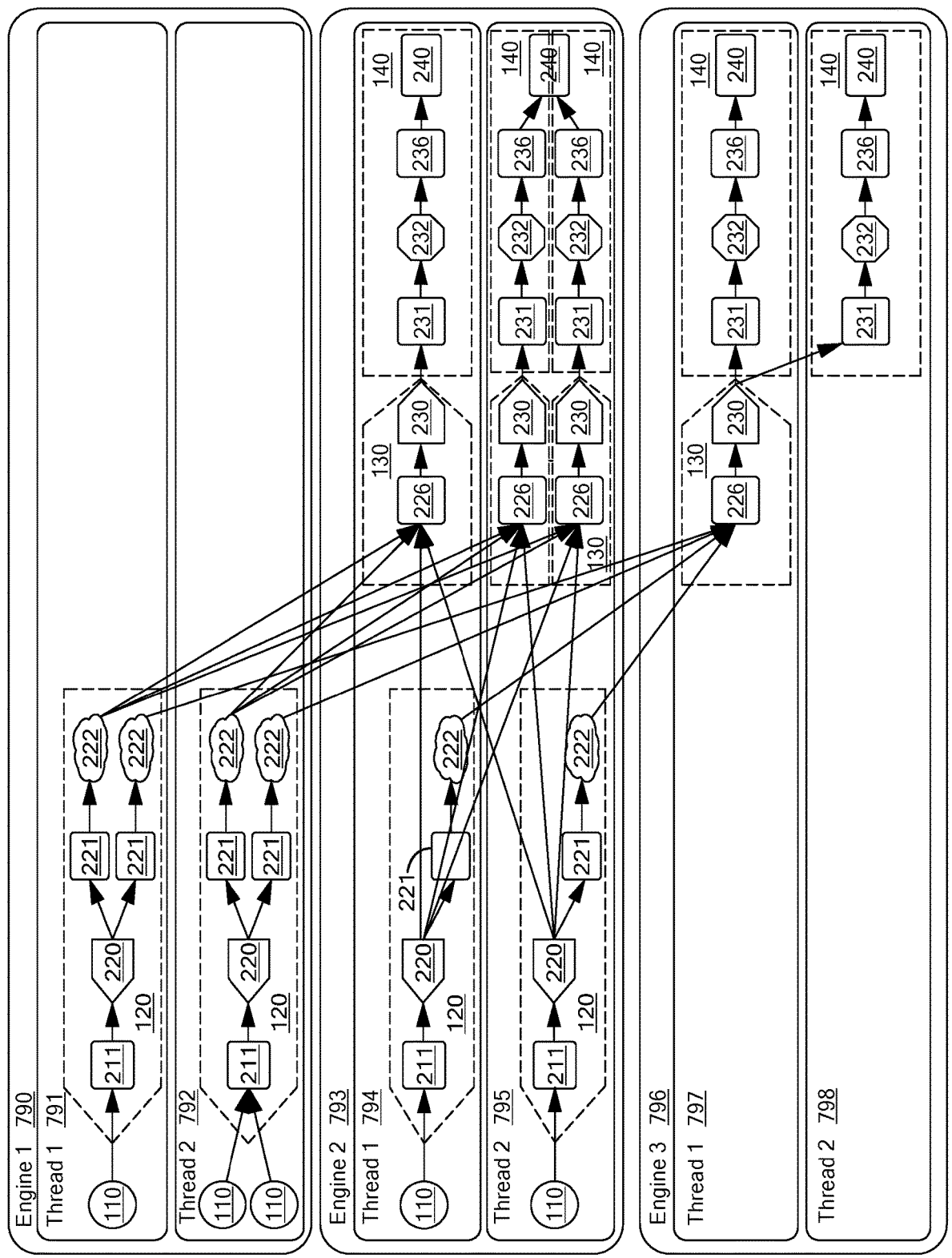
FIGS. 7-9 are examples of distributed processing configurations.
Figure 8:
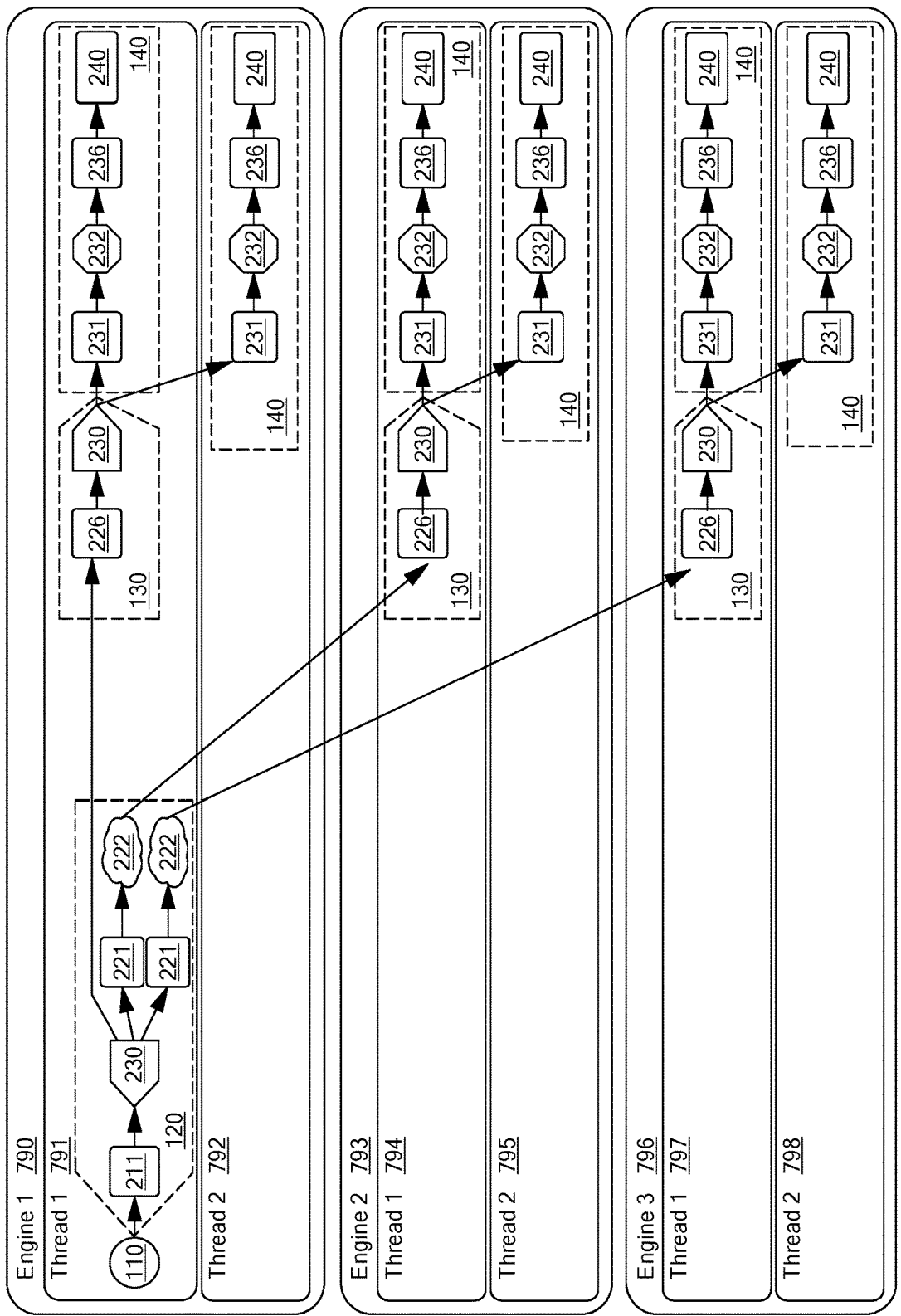
Figure 9:
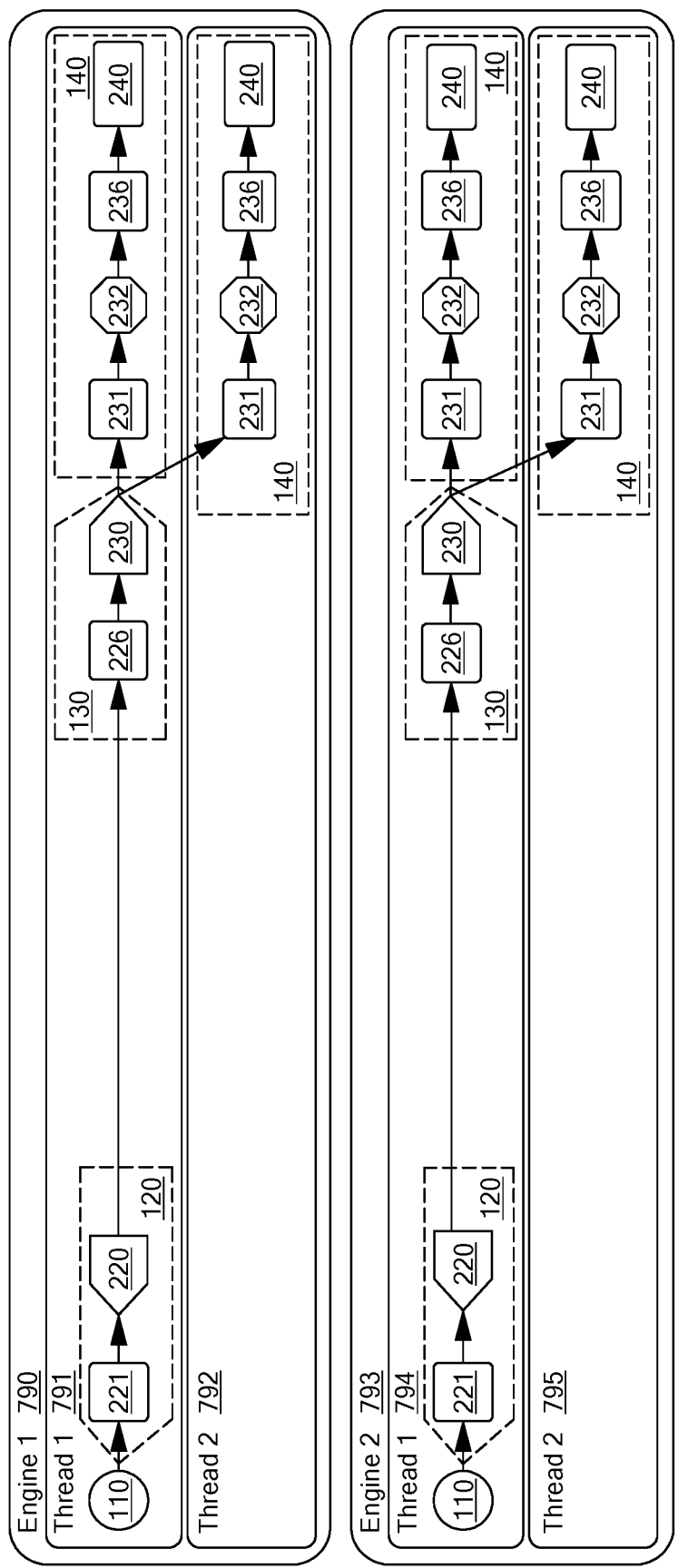

Referring to FIGS. 7-9, the elements introduced above support a variety of topologies. Three examples are discussed below. In general these topologies can be considered to have eleven layers, with each layer being dedicated to a particular function of the forall record generation, routing, serialization and processing.

One significant property of these topology graphs is that there is at most one path between any pair of a source 110 and an accept group 130. This ensures that records produced from the same source and processed in the same partition will always be processed in order, unless re-ordering is explicitly allowed downstream of the accepted group.

Referring to FIG. 7, in a relatively general case there can be many record sources 110 on each engine 790, 793, 796 (with each engine having multiple processing threads 791, 792, 794, 795, 797, 798) being partitioned to many partitions spread across multiple other engines. Engines involved in a forall topology can host sources and partition groups, or accept groups and worker groups, or both. The components illustrated in FIG. 7 are numbered consistently with the description of FIGS. 1-6, above. One note is that a worker 240 may be shared among multiple work groups 140 within one processing thread, as shown in FIG. 7 for processing thread 795.

The full generality of the eleven-layer topology pattern is not needed in all cases, so there are various specializations and optimizations that may be applied. Referring to FIG. 8, one common pattern is to fan-out from an unpartitioned source 110 (on thread 791), such as a serial file, to process across all available threads 791, 792, 794, 795, 797, 798 in the cluster.

Referring to FIG. 9, another common use case is to process data using aligned partitions to avoid moving data across engines. In this example, there is no data transfer between engine 790 and engine 793, although multiple processing threads are utilized on each engine.

As introduced above, a configuration of components may be determined before execution according to the processing to the data collection that is required, the locations of the data sources, and the available computation resources. As the sources are exhausted (i.e., the have provided all their data elements), and End-of-Information (EOI) element is propagated through the data paths thereby permitting the components to be shut down, ultimately shutting down all the components when all the processing of data elements has completed.

As introduced above, there are times when it may be desirable to alter the configuration of components during the processing of the data collection. Various reasons for such reconfiguration may be prompted by the adding or removing computing resources (e.g., server computers, processing threads etc.) or observation of load imbalance resulting from a particular partitioning rule and wishing to alter the partitioning rule to balance load.

During the time that a configuration is static, data elements are partitioned correctly and processed in order satisfying the partitioning constraints. Such a period of time during which the configuration is static is referred to as a routing epoch. A transition between one routing epoch and another routing epoch is affected as a series reconfigurations such that the data elements remain properly partitioned and processed.

As introduced above, one approach to making a transition from one routing epoch to another is to essentially stop providing data elements from the sources, and processing an end-of-information element along all paths until all components are essentially quiescent, at which time the components can be reconfigured and then the next epoch started. However, it should be evident that such an approach will leave many computing resources under-utilized during the transition.

In a more efficient approach, for example, source or destination of individual data paths in the configuration are changed, and individually quiescent components (e.g., empty queues, idle workers, etc.) are terminated or moved between computer servers or threads, and new components are started and connected to existing or new data paths.

Figure 10:
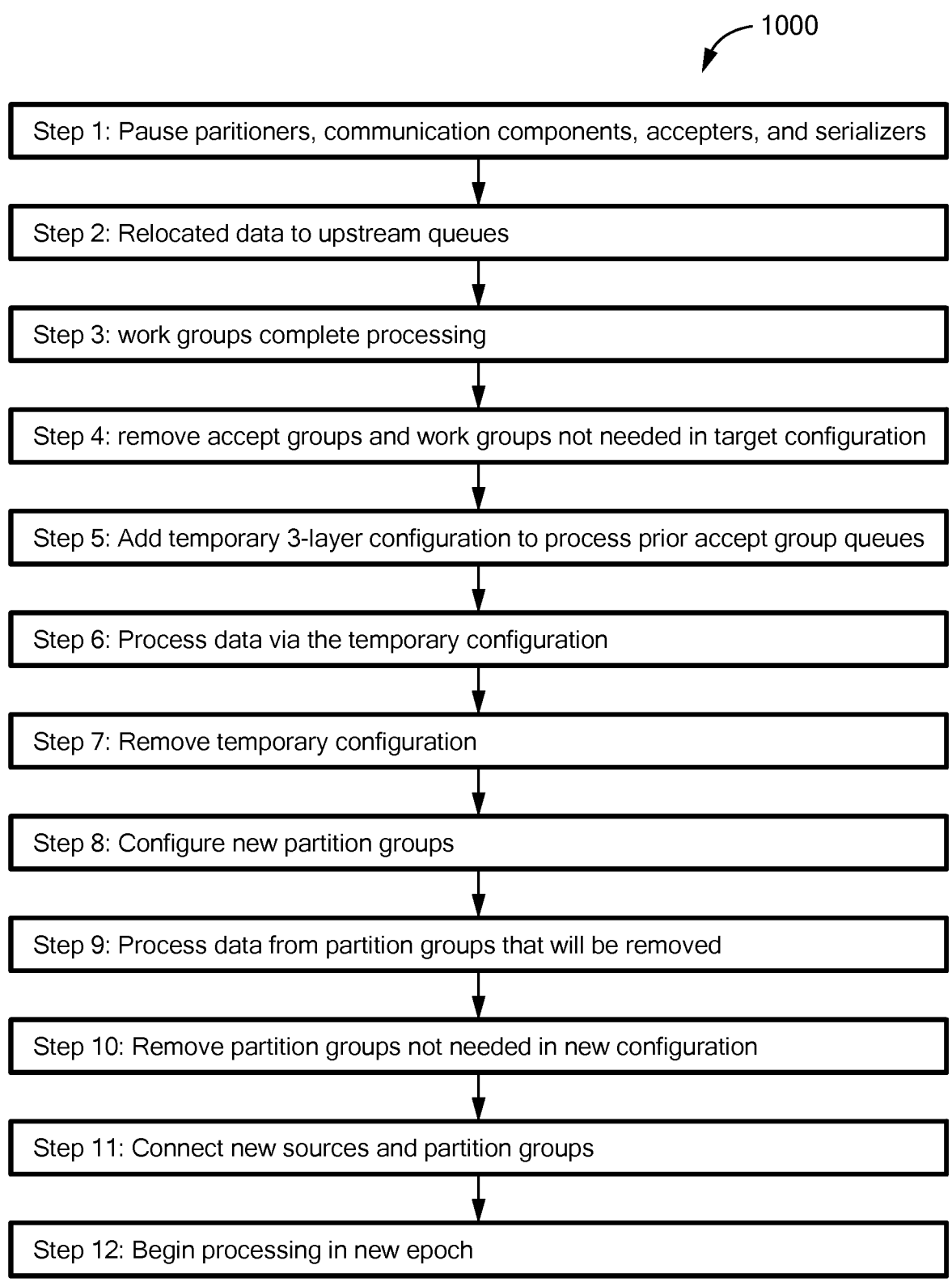
FIG. 10 is a flowchart of a reconfiguration procedure.

One example of such a sequencing involves the following steps, which are illustrated in a flowchart 1000 in FIG. 10.

Step 1. A number of components are paused so that no data elements are being processed. In particular, all partitioners 220 are paused such that there are no data elements that are being processed by the partition groups 120 (i.e., referring to FIG. 2, any data element read from the queue 211 has been emitted on an output data path 121, 122, or 223). The communication components 222 are also paused, generally leaving at least some data elements in the queues 221 between the partitioners 220 and the communication components 222. The accepters 230 are also paused, generally leaving data elements in the queues 226. The serializer 232 is also paused. The components of the work groups 140 continue to operate.

Step 2. Data in certain queues is relocated to the head of upstream queues. In particular, the content of each queues 221 is enqueued at the head of the corresponding queue 211 of the same partition group 120, with the partitioner 220 remaining paused so that these data elements are not immediately dequeued. Similarly, the contents of the FIFO queue 231 and the queues 236 of each work group 140 are enqueued at the head of the queue 226 of the upstream accept group 130 of the type shown 130A in FIG. 4, or enqueued at the head of the first downstream queue from the accept group 130 when the upstream accept group 130 is of the type 130B shown in FIG. 5.

Step 3. The processing of the work groups 140 is permitted to complete. At this point, no data elements are enqueued in the configuration with the exception of the queues 211 of the partition groups 120 and the queues 226 of the accept groups 130.

Step 4. The configuration is then altered to remove any accept group 130 or work group 140 that is not needed in the new configuration, retaining the queues 226 that have pending data elements. The queue 226 of any retained accept group 130 is disconnected from its accepter 230 and a new empty queue 226 is attached to it.

Step 5. The data elements of the queues 226 are processed prior to processing the data elements of the queues 211 or data elements that have not yet been read from the sources 100. A temporary three-layers configuration of components is constructed to process the accept the data records of from the queues 226, pass them though partitioner 220 configure according to the new configuration and send the data records to accept groups 130 of the new configuration.

Step 6. An End-of-Information (EOI) marker is inserted at the end of each of the old queues 226. The temporary components constructed in Step 5 are unpaused, and the system waits for the temporary components to have passed the EOI markers indicating that they are inactive.

Step 7. At this point, all of the existing data elements that had been partitioned in the previous routing epoch will be in the correct acceptor groups 130 for the new routing epoch. The temporary components constructed in Step 5, as well as the old queues 226 are removed.

Step 8. All the partitioners 220 of the partition groups 120 are configured for the new epoch.

Step 9. The data elements in the queues 211 from the previous epoch that are not used in the new epoch (because their sources 100 are not used) are now processed by adding an EOI marker to each queue, and then the partitioners 220 for those queues (configured according to the new partitioning rules) are unpaused. When the EOI markers have passed through all the components of those partition groups, all the data records that are in "in flight" are in their correct acceptor groups 130 or work groups 140.

Step 10. The sources 100 and corresponding partition groups 120 that are not used in the new configuration are removed.

Step 11. New sources 100 and partition groups are added and connected into the new configuration.

Step 12. All components of the new configuration are unpaused and the new epoch begins.

Figure 11B:
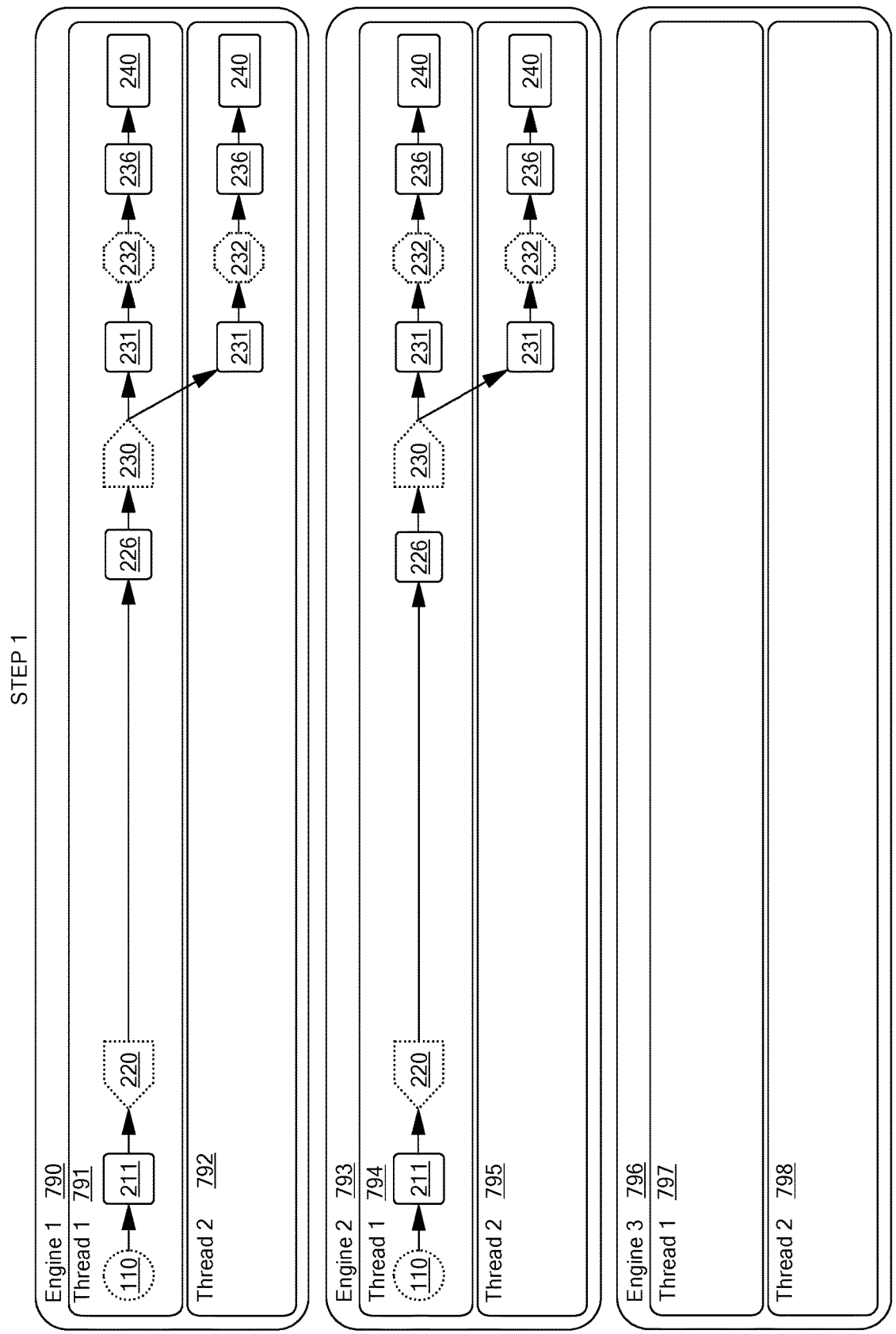

Referring to FIGS. 11A-I, an example of the reconfiguration procedure as described above is provided. Referring to FIG. 11A, initially execution of a forall over a data source is partitioned across two engines 790, 793, and there is a need to transition one of the sources 110 and its work groups 140. FIG. 11A shows the initial topology during routing epoch 1, and FIG. 11I shows the desired topology in which the use of engine 793 has been replaced with use of engine 796.

Figure 11C:
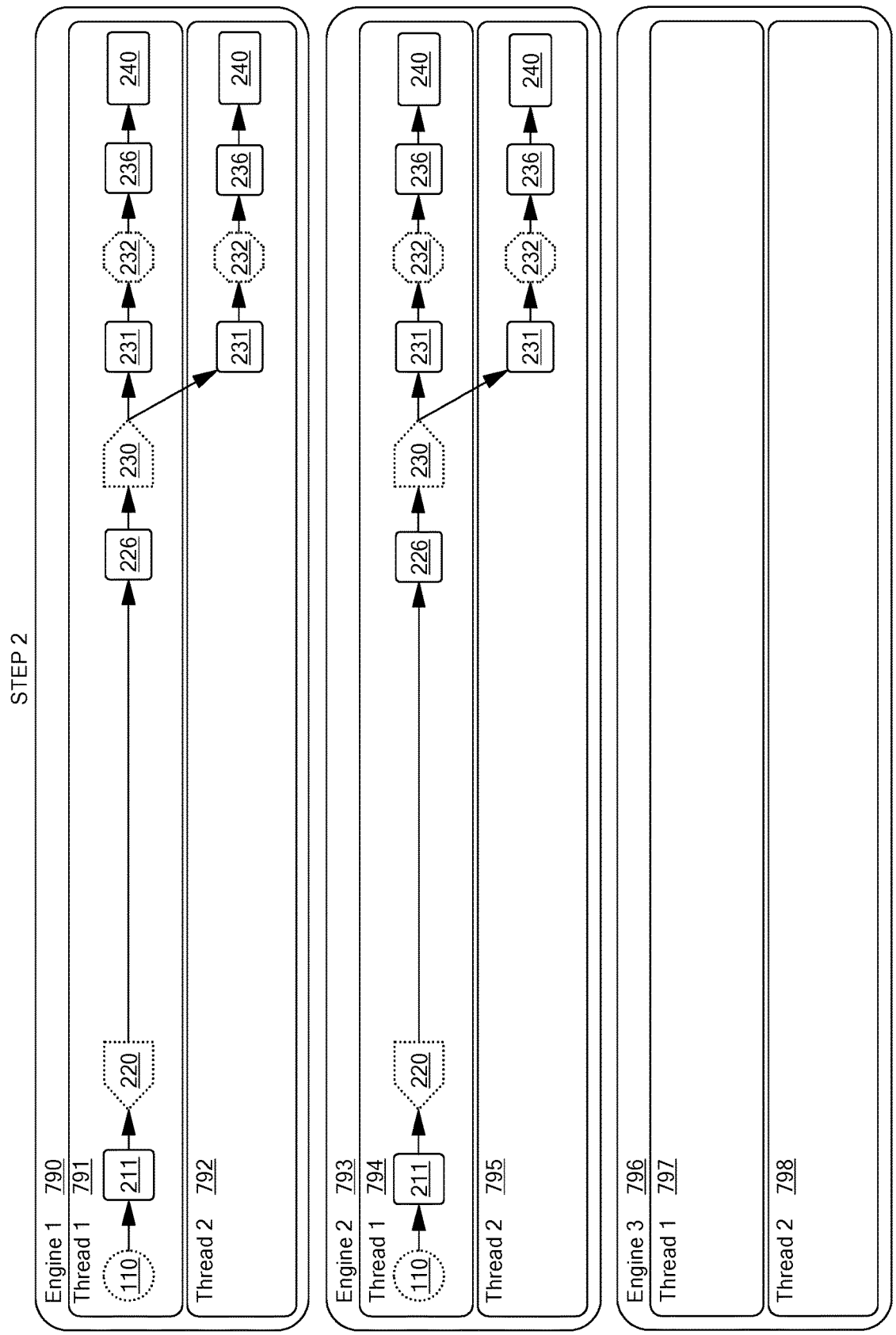

Referring to FIG. 11B, in step 1, the sources 110, partitioners 220, acceptors 230 and serializers 232 are paused, indicated by dotted outlines in the figure. In FIG. 11B, the paused components are illustrated with dotted outlines. Referring to FIG. 11C, in step 2, records are then moved from the queues 221 (there are none in the example) back to the front of the queues 211 and from the FIFO queues 231, serializers 232 and queues 236 back onto the front of the queues 226, preserving the data element order. Referring to FIG. 11D, in step 3, when the forall becomes idle, step 4 of the process makes the first alteration of the forall topology by reconfiguring the back half of the topology graph.

Figure 11E:
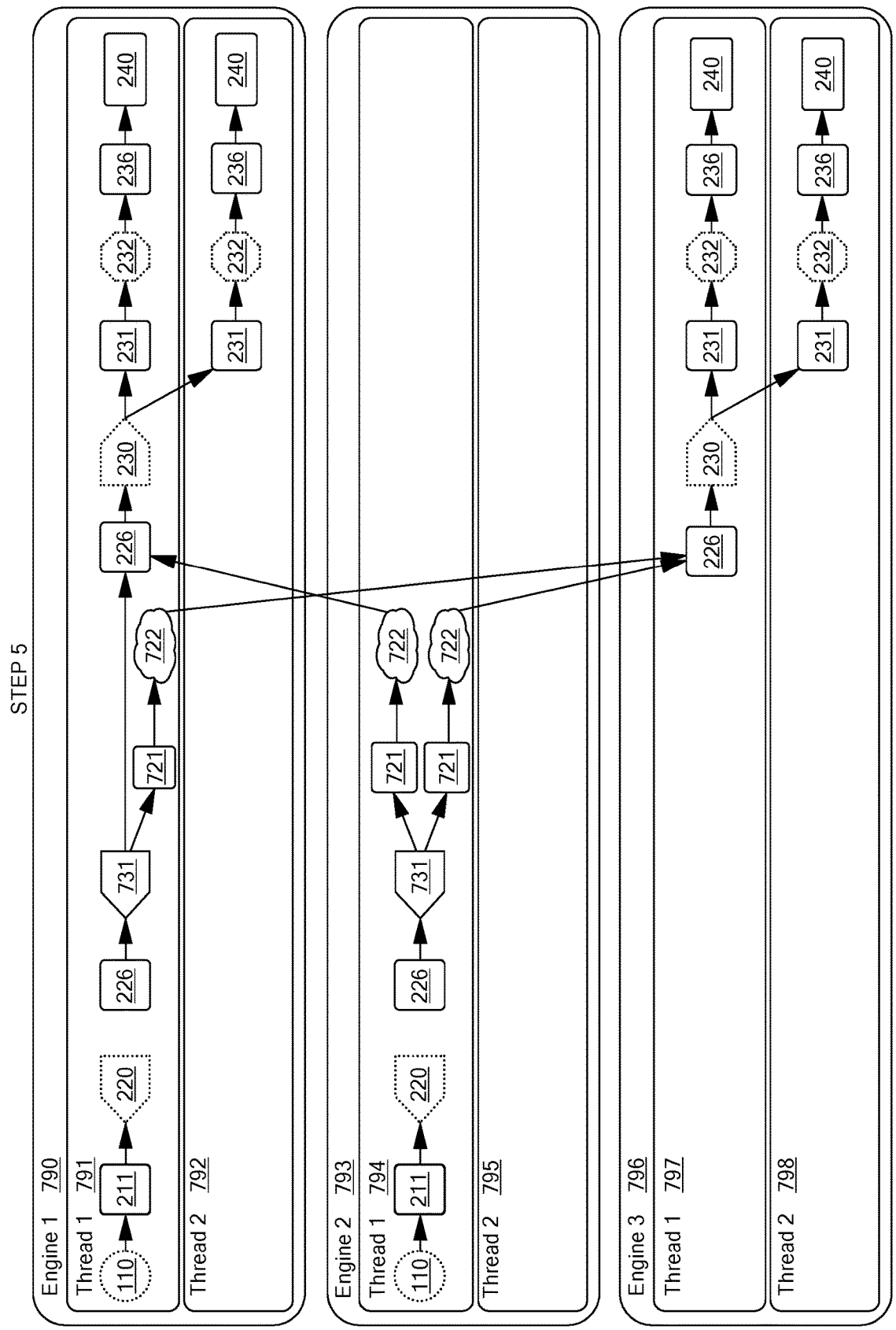

Referring to FIG. 11E, step 5 temporarily adds three levels into the topology to repartition data elements from the old queues 226 into the new FIFO queues 231 via new components include partitioners 720, queues 721, and communication components 722.

Referring to FIG. 11F, in step 6, executing this new portion of the topology will repartition the data elements into the new FIFO queues 231. In this example, the records on Engine1 stay on Engine1 but the records on Engine2 move to Engine3. In general, the repartitioning can be all-to-all. This allows data elements from different sources to mix in the FIFO queues 231, but all records that originated at the same source and have the same partitioning key will remain in order because they will all have been together in the same old FIFO queue. Likewise, data elements that were in different queues intermixed during repartitioning, but ordering within partitions and serialization key groups is preserved.

Figure 11G:
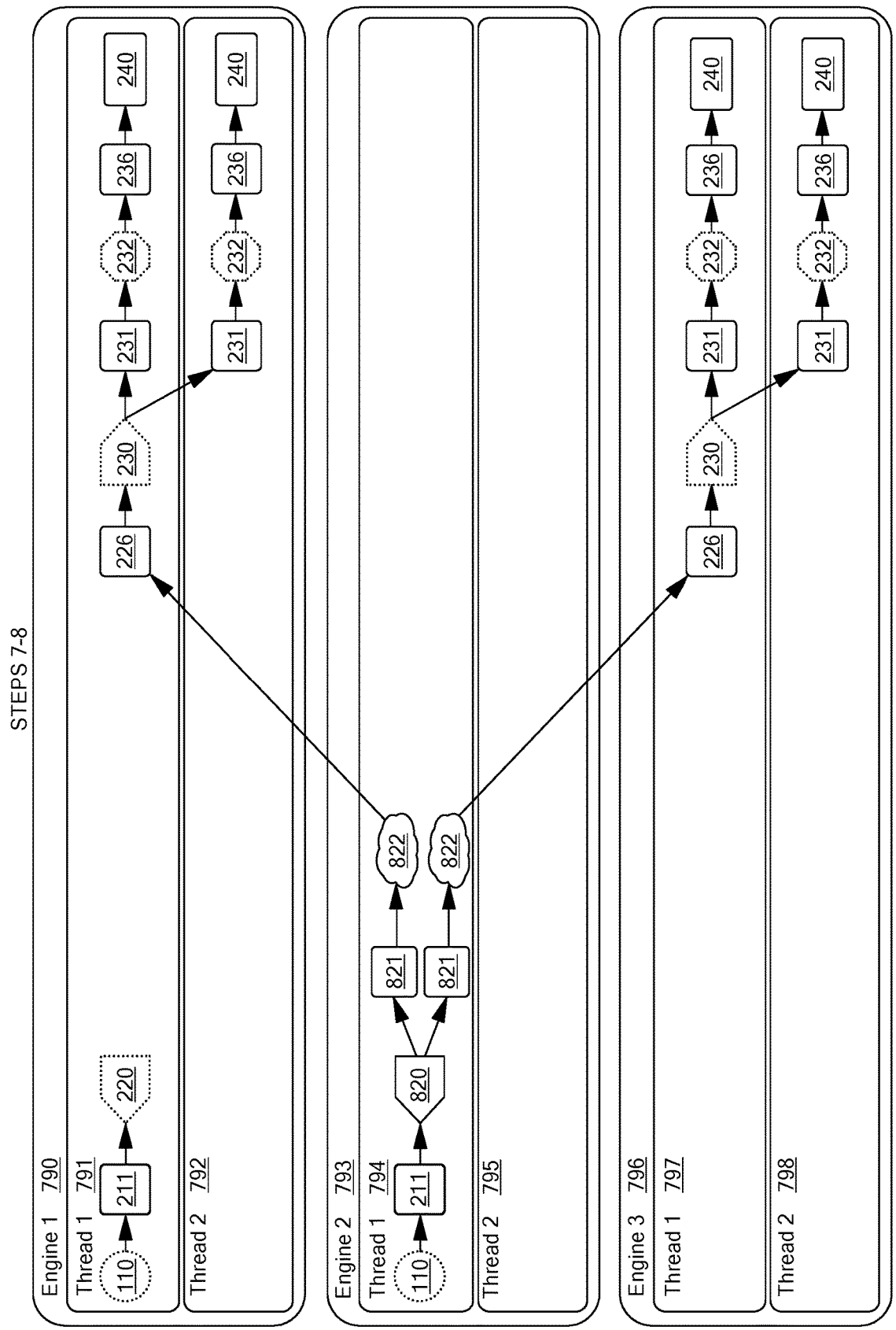
Figure 11H:
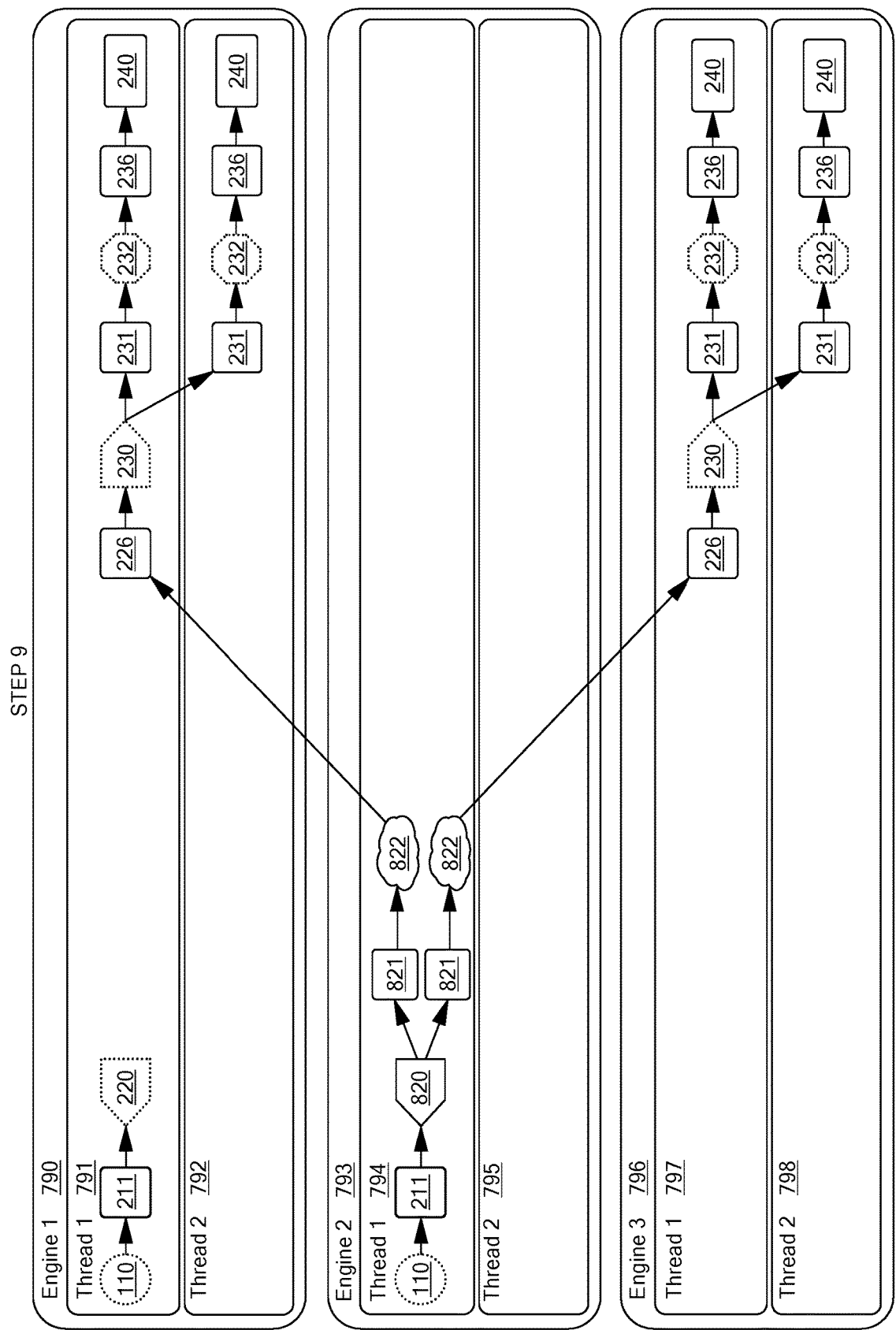

Referring to FIG. 11G, steps 7 and 8 remove the temporary components 720, 721, 722 and reconfigure the front half of the topology to repartition data elements from sources 110 that are going away using new components including partitioners 820, queues 821, and communication components 822. Referring to FIG. 11H, executing the transitional topology moves records from all queues 211 that are going away to their correct FIFO queues 231 for the new routing epoch. Steps 10 and 11 reconfigure the topology into its final form for the new routing epoch, as shown in FIG. 11I. With the data repartitioned, ordering preserved and the topology fully transitioned, step 12 can safely resume execution in the new routing epoch.

In description above that refers to enqueueing data, or otherwise moving data from queue to queue, it should be understood that when the source and destination of such a transfer are with a single process or thread, or among processes or threads that share an address space, the movement may be implemented by leaving the data element in place and merely moving pointers to the data element. Similarly, in procedures that describe moving content of a queue A to the head of a queue B, and then processing elements from queue B may be implemented via a sequence of configurations in which in a first configuration queue A supplies all its elements in turn, and after all the elements of queue A are exhausted, then in a second configuration queue B provides its elements in turn.

The approach described above can be implemented, for example, using a programmable computing system executing suitable software instructions or it can be implemented in suitable hardware such as a field-programmable gate array (FPGA) or in some hybrid form. For example, in a programmed approach the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user interface (for receiving input using at least one input device or port, and for providing output using at least one output device or port). The software may include one or more modules of a larger program, for example, that provides services related to the design, configuration, and execution of dataflow graphs. The modules of the program (e.g., elements of a dataflow graph) can be implemented as data structures or other organized data conforming to a data model stored in a data repository.

The software may be stored in non-transitory form, such as being embodied in a volatile or non-volatile storage medium, or any other non-transitory medium, using a physical property of the medium (e.g., surface pits and lands, magnetic domains, or electrical charge) for a period of time (e.g., the time between refresh periods of a dynamic memory device such as a dynamic RAM). In preparation for loading the instructions, the software may be provided on a tangible, non-transitory medium, such as a CD-ROM or other computer-readable medium (e.g., readable by a general or special purpose computing system or device), or may be delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The inventive system may also be considered to be implemented as a tangible, non-transitory medium, configured with a computer program, where the medium so configured causes a computer to operate in a specific and predefined manner to perform one or more of the processing steps described herein.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A method for distributed processing of a data collection, the method including:

receiving, over an input device or port, information for configuring a distributed processing system, the configuring including forming a first configuration of components of the distributed processing system, the first configuration including a plurality of sources of data elements of the data collection and a plurality of workers configured to process data elements of the data collection, the sources and workers being distributed among a plurality of computing resources, wherein each data element includes a data partition value that identifies a subset of the plurality of workers of the first configuration according to a data partition rule of the first configuration; and processing data in the distributed processing system during at least two processing epochs, the processing including:

accepting data elements from the sources for a first part of the data collection in a first processing epoch and routing said data elements through the first configuration and completing processing of at least some of said data elements, wherein other of the data elements of the first part remain queued at components of the first configuration;

after accepting a first part of the data collection, initiating change of configuration of the distributed processing system from the first configuration to a second configuration;

after initiating the change of configuration, performing a succession of two or more transitions between configurations of components of the system to a succession of modified configurations of components, and after each transition causing transfer of data elements between components of the modified configuration, wherein a last of said modified configurations corresponds to the second configuration, thereby completing a transition from the first configuration to the second configuration; and after completing a transition to the second configuration, accepting further data elements of the data collection from a plurality of sources of the second configuration in a second processing epoch.

2. The method of claim 1 wherein the plurality of computing resources includes a plurality of processors coupled via communication links.

3. The method of claim 2 wherein the plurality of computing resources includes at least one processing thread executing on each of the plurality of processors, each computing resource being associated with a distinct processing thread.

4. The method of claim 1 wherein the plurality of workers includes one or more workers each worker of said one or more workers being coupled to an accepter module configured to accept data elements from a plurality of partitioner modules.

5. The method of claim 4 wherein data elements are received from any one of the partitioner modules in a first-in-first-out order.

6. The method of claim 1 wherein each data element further includes a serialization value, and wherein during the first processing epoch, processing using the first configuration enforces a serialization policy whereby no two data elements with a same serialization value are processed by a worker concurrently with one another.

7. The method of claim 6 wherein the plurality of workers includes one or more workers each worker of said one or more workers being coupled to an accepter module configured to accept data elements from a plurality of partitioner modules, the accepter module being configured to enforce a serialization policy whereby no two data elements with a same serialization value are processed by a worker coupled to said accepter module concurrently with one another.

8. The method of claim 6 wherein after the first processing epoch and prior to the second processing epoch, processing according to each modified configuration continues to enforce the serialization policy.

9. The method of claim 1 wherein during the first processing epoch, processing using the first configuration of components enforces a partition policy whereby all data elements with a same data partition value accepted from a first data source in a first order are provided to a same subset of the plurality of workers in the first order.

10. The method of claim 9 wherein after the first processing epoch and prior to the second processing epoch, data elements of the first part of the data that have not completed processing in the first processing epoch and with the same data partition value accepted from the first data source are provided to the same worker in the first order.

11. The method of claim 10 wherein at least some of said data elements are transferred between components of the modified configurations.

12. The method of claim 1 wherein the second configuration of components differs from the first configuration in at least one of: (a) a partition rule; (b) a set of sources; and (c) a set of workers.

13. A method for distributed processing of a data collection, the method including:

receiving, over an input device or port, information for configuring a distributed processing system, the configuring including forming a first configuration of components of the distributed processing system, the first configuration including a plurality of sources of data elements of the data collection and a plurality of workers configured to process data elements of the data collection, the sources and workers being distributed among a plurality of computing resources, wherein each data element includes a partition value that identifies a subset of the plurality of workers of the first configuration according to a partition rule of the first configuration; and processing data in the distributed processing system during at least two processing epochs, the processing including:

accepting data elements from the sources for a first part of the data collection in a first processing epoch and routing said data elements through the first configuration and completing processing of at least some of said data elements, wherein other of the data elements of the first part remain queued at components of the first configuration;

after accepting a first part of the data collection, initiating change of configuration of the distributed processing system from the first configuration to a second configuration;

after initiating the change of configuration, performing a succession of two or more transitions between configurations of components of the system to a succession of modified configurations of components, and after each transition causing transfer of data elements between components of the modified configuration, wherein a last of said modified configurations corresponds to the second configuration, thereby completing a transition from the first configuration to the second configuration; and after completing a transition to the second configuration, accepting further data elements of the data collection from a plurality of sources of the second configuration in a second processing epoch, wherein each source of data elements is coupled to a partitioner module configured to accept data elements from the source, and wherein each partitioner is configured with the partition rule to direct data elements to a worker identified according to the partition rule.

14. The method of claim 13 performing a first transition of the succession of two or more transitions between configurations of components of the system includes
halting operation of the partitioner modules, stopping of acceptance of data elements from the sources at the partitioner modules,
reconfiguring the plurality of partition modules with a modified partition rule, and
coupling at least one queue of data elements accepted from a source to provide data elements to a partition module reconfigured with the modified partition.

15. The method of claim 13 wherein each partitioner module is hosted on a same computing resource as a source coupled to said partitioner module, wherein passing data elements from said source to said partitioner is performed without requiring inter-processor communication.

16. The method of claim 13 wherein the plurality of workers includes one or more workers each worker of said one or more workers being coupled to an accepter module configured to accept data elements from a plurality of partitioner modules.

17. The method of claim 16 wherein each accepter module is hosted on a same computing resource as a worker coupled to said accepter module, wherein passing data elements from said accepter module to said worker is performed without requiring inter-processor communication.

18. The method of claim 16 wherein a first partitioner module is hosted on a same computing resource as a first accepter module, and is hosted on a different computing resource than a second accepter module, and wherein routing the data elements includes passing data elements from the first partitioner module to the first accepter module without requiring inter-processor communication, and wherein routing the data elements includes queuing data elements at the first partitioner module prior to inter-processor communication of said data elements for passing to the second accepter module.

19. A method for distributed processing of a data collection, the method including:
receiving, over an input device or port, information for configuring a distributed processing system, the configuring including forming a first configuration of components of the distributed processing system, the first configuration including a plurality of sources of data elements of the data collection and a plurality of workers configured to process data elements of the data collection, the sources and workers being distributed among a plurality of computing resources, wherein each data element includes a partition value that identifies a subset of the plurality of workers of the first configuration according to a partition rule of the first configuration; and
processing data in the distributed processing system during at least two processing epochs, the processing including:
accepting data elements from the sources for a first part of the data collection in a first processing epoch and routing said data elements through the first configuration and completing processing of at least some of said data elements, wherein other of the data elements of the first part remain queued at components of the first configuration;
after accepting a first part of the data collection, initiating change of configuration of the distributed processing system from the first configuration to a second configuration;
after initiating the change of configuration, performing a succession of two or more transitions between configurations of components of the system to a succession of modified configurations of components, and after each transition causing transfer of data elements between components of the modified configuration, wherein a last of said modified configurations corresponds to the second configuration, thereby completing a transition from the first configuration to the second configuration; and
after completing a transition to the second configuration, accepting further data elements of the data collection from a plurality of sources of the second configuration in a second processing epoch,
wherein each source of data elements is coupled to a partitioner module configured to accept data elements from the source, and wherein each partitioner is configured with the partition rule to direct data elements to a worker identified according to the partition rule,
the plurality of workers includes one or more workers each worker of said one or more workers being coupled to an accepter module configured to accept data elements from a plurality of partitioner modules, and
performing a first transition of the succession of two or more transitions between configurations of components of the system includes
halting operation of the partitioner modules, stopping of acceptance of data elements from the sources at the partitioner modules,
halting operation of the plurality of accepter modules,
reconfiguring the plurality of partition modules with a modified partition rule, and
coupling at least one queue of an accepter module of the plurality of accepter modules to provide data elements to a partition module reconfigured with the modified partition.

20. A non-transitory machine-readable medium with software for distributed processing of a data collection stored thereon, the software including instructions that, when executed by one or more processors of a data processing system, cause the data processing system to:
receive, over an input device or port, information for configuring a distributed processing system, the configuring including forming a first configuration of components of the distributed processing system, the first configuration including a plurality of sources of data elements of the data collection and a plurality of workers configured to process data elements of the data collection, the sources and workers being distributed among a plurality of computing resources, wherein each data element includes a data partition value that identifies a subset of the plurality of workers of the first configuration according to a partition rule of the first configuration; and
process data in the distributed processing system during at least two processing epochs, the processing including:
accepting data elements from the sources for a first part of the data collection in a first processing epoch and routing said data elements through the first configuration and completing processing of at least some of said data elements, wherein other of the data elements of the first part remain queued at components of the first configuration;

after accepting a first part of the data collection, initiating change of configuration of the distributed processing system from the first configuration to a second configuration;

after initiating the change of configuration, performing a succession of two or more transitions between configurations of components of the system to a succession of modified configurations of components, and after each transition causing transfer of data elements between components of the modified configuration, wherein a last of said modified configurations corresponds to the second configuration, thereby completing a transition from the first configuration to the second configuration; and after completing a transition to the second configuration, accepting further data elements of the data collection from a plurality of sources of the second configuration in a second processing epoch.

21. A distributed processing system for distributed processing of a data collection, the distributed processing system including:

means for receiving information for configuring the distributed processing system, the configuring including forming a first configuration of components of the distributed processing system, the first configuration including a plurality of sources of data elements of the data collection and a plurality of workers configured to process data elements of the data collection, the sources and workers being distributed among a plurality of computing resources, wherein each data element includes a data partition value that identifies a subset of the plurality of workers of the first configuration according to a partition rule of the first configuration; and means for processing data during at least two processing epochs, the processing including:

accepting data elements from the sources for a first part of the data collection in a first processing epoch and routing said data elements through the first configuration and completing processing of at least some of said data elements, wherein other of the data elements of the first part remain queued at components of the first configuration;

after accepting a first part of the data collection, initiating change of configuration of the distributed processing system from the first configuration to a second configuration;

after initiating the change of configuration, performing a succession of two or more transitions between configurations of components of the system to a succession of modified configurations of components, and after each transition causing transfer of data elements between components of the modified configuration, wherein a last of said modified configurations corresponds to the second configuration, thereby completing a transition from the first configuration to the second configuration; and after completing a transition to the second configuration, accepting further data elements of the data collection from a plurality of sources of the second configuration in a second processing epoch.

22. A distributed processing system, the distributed processing system including a plurality of hardware-based processing engines and configured to execute configurations of components distributed among said processing engines according to a first configuration of components, and to enable a transition to a second configuration of components via a succession of transitions between configurations of components of the system to a succession of modified configurations of components, wherein the first configuration of components includes:

a plurality of sources of data elements of the data collection and a plurality of workers configured to process data elements of the data collection, the sources and workers being distributed among a plurality of processing engines, wherein each data element includes a data partition value that identifies a subset of the plurality of workers of the first configuration according to a partition rule of the first configuration;

a plurality of partitioner modules, each partitioner module being configured to accept data elements from the source, and wherein each partitioner is configured with the partition rule to direct data elements to a worker identified according to the partition rule; and a plurality of accepter modules, each accepter module configured to accept data elements from a plurality of partitioner modules, and to provide data elements to at least one worker;

wherein the system is configured to change from the first configuration to the second configuration by performing a succession of two or more transitions between configurations of components of the system to a succession of modified configurations of components, and after each transition causing transfer of data elements between components of the modified configuration, wherein a last of said modified configurations corresponds to the second configuration, thereby completing a transition from the first configuration to the second configuration.

* * * * *